US012561591B2

(12) United States Patent
Harvey et al.

(10) Patent No.: US 12,561,591 B2
(45) Date of Patent: Feb. 24, 2026

(54) CLASSIFICATION AND TRANSFORMATION OF SEQUENTIAL EVENT DATA

(71) Applicant: P44, LLC, Chicago, IL (US)

(72) Inventors: William Enerson Harvey, San Francisco, CA (US); Thomas Janos Atwood, Venice, CA (US); Marc-Henri Gires, New York, NY (US)

(73) Assignee: P44, LLC, Chicago, IL (US)

( * ) Notice: Subject to any disclaimer, the term of this patent is extended or adjusted under 35 U.S.C. 154(b) by 79 days.

(21) Appl. No.: 18/414,211

(22) Filed: Jan. 16, 2024

(65) Prior Publication Data

US 2024/0232668 A1    Jul. 11, 2024

Related U.S. Application Data

(63) Continuation of application No. 17/955,817, filed on Sep. 29, 2022, now Pat. No. 11,907,866, which is a
(Continued)

(51) Int. Cl.
G06N 7/00 (2023.01)
G06F 9/54 (2006.01)
(Continued)

(52) U.S. Cl.
CPC ............... G06N 7/01 (2023.01); G06F 9/542 (2013.01); G06F 16/258 (2019.01);
(Continued)

(58) Field of Classification Search
CPC .......... G06N 7/01; G06N 20/00; G06F 9/542; G06F 16/258; G06F 16/285; G06Q 10/047
See application file for complete search history.

(56) References Cited

U.S. PATENT DOCUMENTS

| 6,421,809 B1 * | 7/2002 | Wuytack | G06F 30/30 |
| | | | 716/132 |
| 2003/0130855 A1 * | 7/2003 | Babu | H03M 7/30 |
| | | | 704/500 |

(Continued)

OTHER PUBLICATIONS

Huiyi Hu, Graph Based Models for Unsupervised High Dimensional Data Clustering and Network Analysis, University of California, Los Angeles, A dissertation submitted in partial satisfaction of the requirements for the degree Doctor of Philosophy in Mathematics, 2015.

*Primary Examiner* — Tuan C Dao

(74) *Attorney, Agent, or Firm* — MARSHALL, GERSTEIN & BORUN LLP

(57) ABSTRACT

A method and system are provided that apply a combination of machine learning and graph techniques to classify and transform sequential event data. In some embodiments, the method and system are applied to generate raw data in the shipping industry to automatically classify a sequence of status codes extracted from EDI data files corresponding to a series of physical events experienced by a shipping container into a sequence of meaningful milestones to provide improved visibility regarding the actual status of the shipping container. The method and system can be applied to classify and transform sequential event data for use in the shipping industry and in other applications.

20 Claims, 23 Drawing Sheets

Related U.S. Application Data continuation of application No. 15/965,540, filed on Apr. 27, 2018, now Pat. No. 11,488,044.

(51) Int. Cl.

| | |
|---|---|
| *G06F 16/25* | (2019.01) |
| *G06F 16/28* | (2019.01) |
| *G06N 7/01* | (2023.01) |
| *G06N 20/00* | (2019.01) |
| *G06Q 10/047* | (2023.01) |

(52) U.S. Cl.
CPC .......... *G06F 16/285* (2019.01); *G06N 20/00* (2019.01); *G06Q 10/047* (2013.01)

(56) References Cited

U.S. PATENT DOCUMENTS

| | | | | |
|---|---|---|---|---|
| 2003/0169042 | A1* | 9/2003 | Feinberg | G01R 33/4835 |
| | | | | 324/309 |
| 2006/0291485 | A1 | 12/2006 | Thubert et al. | |
| 2007/0118601 | A1* | 5/2007 | Pacheco | H04L 51/226 |
| | | | | 709/206 |
| 2008/0154873 | A1* | 6/2008 | Redlich | G06F 16/951 |
| | | | | 707/999.005 |
| 2008/0201724 | A1* | 8/2008 | Endrikhovski | G06F 11/328 |
| | | | | 714/E11.184 |
| 2008/0209436 | A1 | 8/2008 | Agha et al. | |
| 2008/0235216 | A1* | 9/2008 | Ruttenberg | G06F 16/9535 |
| | | | | 707/999.005 |
| 2010/0058112 | A1* | 3/2010 | Kim | G06F 11/2252 |
| | | | | 714/E11.029 |
| 2011/0134925 | A1* | 6/2011 | Safrai | H04L 45/586 |
| | | | | 370/395.53 |
| 2011/0280907 | A1 | 11/2011 | Mchardy et al. | |
| 2012/0084004 | A1 | 4/2012 | Alexandre et al. | |
| 2012/0216176 | A1 | 8/2012 | Gaikwad et al. | |
| 2014/0047402 | A1* | 2/2014 | Terayama | G06F 30/327 |
| | | | | 716/108 |
| 2014/0201126 | A1 | 7/2014 | Zadeh et al. | |
| 2014/0279793 | A1 | 9/2014 | Wohlstadter | |
| 2014/0372433 | A1 | 12/2014 | Dougherty | |
| 2015/0120555 | A1 | 4/2015 | Jung et al. | |
| 2015/0180891 | A1 | 6/2015 | Seward et al. | |
| 2015/0269242 | A1* | 9/2015 | Dey | G06F 16/285 |
| | | | | 707/737 |
| 2017/0024983 | A1* | 1/2017 | Reeves | G08B 13/02 |
| 2017/0086729 | A1 | 3/2017 | Bruno | |
| 2017/0235848 | A1 | 8/2017 | Van Dusen et al. | |
| 2017/0359743 | A1 | 12/2017 | Szilagyi et al. | |
| 2017/0372214 | A1* | 12/2017 | Peng | G06F 17/18 |
| 2018/0039565 | A1 | 2/2018 | Rajagopalan et al. | |
| 2018/0309636 | A1 | 10/2018 | Strom et al. | |
| 2018/0349401 | A1 | 12/2018 | Ikawa et al. | |
| 2019/0158340 | A1 | 5/2019 | Zhang et al. | |

* cited by examiner

111

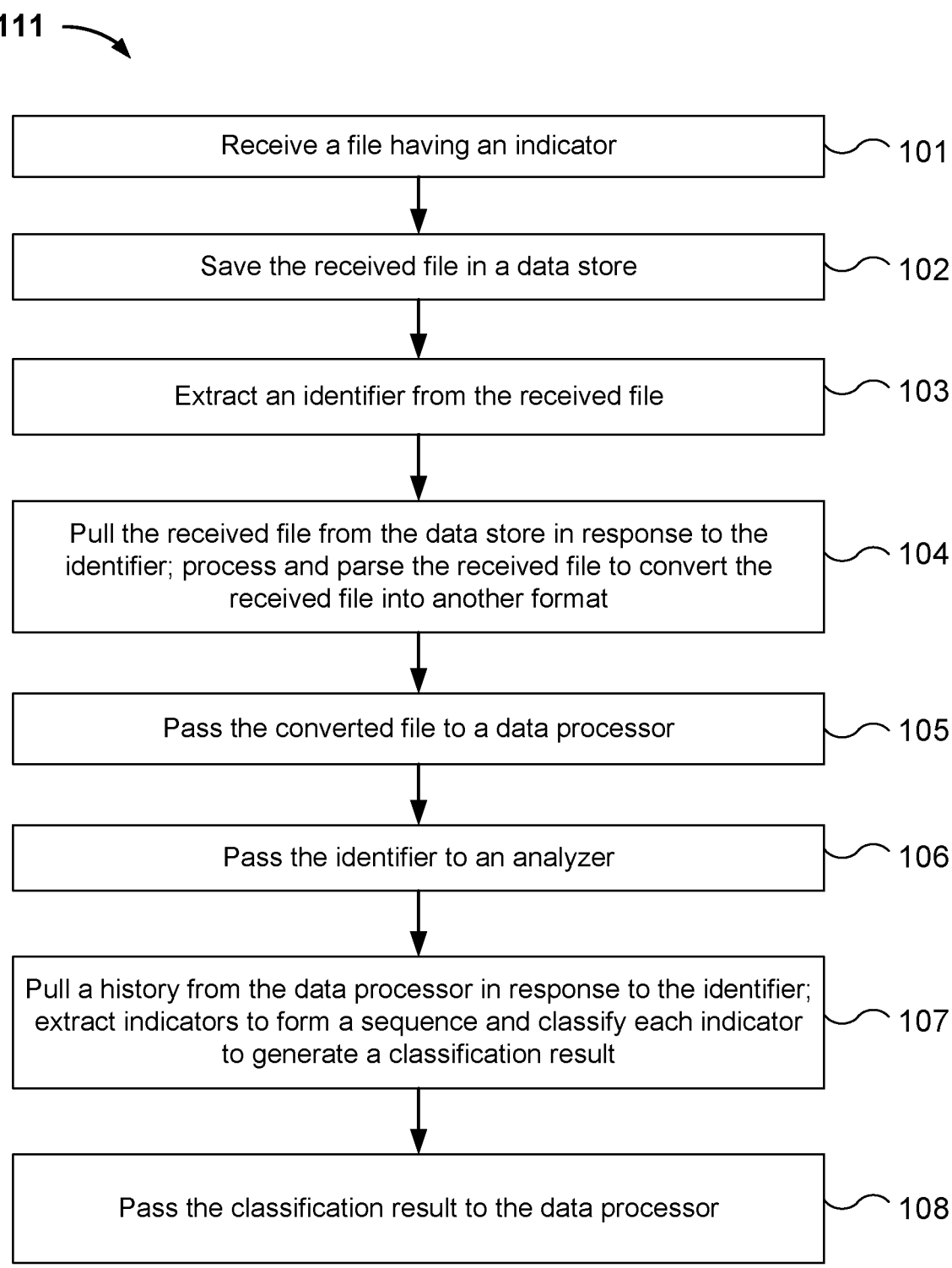

Receive a file having an indicator — 101

Save the received file in a data store — 102

Extract an identifier from the received file — 103

Pull the received file from the data store in response to the identifier; process and parse the received file to convert the received file into another format — 104

Pass the converted file to a data processor — 105

Pass the identifier to an analyzer — 106

Pull a history from the data processor in response to the identifier; extract indicators to form a sequence and classify each indicator to generate a classification result — 107

Pass the classification result to the data processor — 108

FIG. 1B

200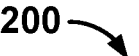

```
ISA*00*      *00*      *ZZ*MAERSKLINE   *ZZ*ANONYMIZED
*170708*0430*U*00401*000935576*0*P*:
GS*QO*MAERSKLINE*ANONYMIZED*20170708*0430*935575*X*004010
ST*315*355750042
B4**0*I*20170701*1824**CAIU*839546*L*4310*INNSA*UN*5
N9*BN*ANONYMIZED
N9*CT*ANONYMIZED
N9*BM*ANONYMIZED
Q2*9252541*DE**20170710**1*44092*G*1706***L*NORTHERN MAGNUM***L
R4*I*UN*INNSA*JAWAHARLAL NEHRU*IN***27
DTM*140*20170701*1824*LT
R4*R*UN*INNSA*JAWAHARLAL NEHRU*IN*JAWAHARLAL NEHRU**27
DTM*140*20170701*1824*LT
R4*L*UN*INNSA*JAWAHARLAL NEHRU*IN*JAWAHARLAL NEHRU**27
DTM*139*20170710*0600*LT
R4*Y*UN*ESALG*ALGECIRAS*ES*ALGECIRAS
DTM*139*20170723*0800*LT
R4*Y*UN*COBUN*BUENAVENTURA*CO*BUENAVENTURA
DTM*139*20170727*0800*LT
R4*I*UN*CLSAI*SAN ANTONIO*CL*SAN ANTONIO TERMINA
DTM*139*20170825*0700*LT
R4*E*UN*CLSAI*SAN ANTONIO*CL*SAN ANTONIO TERMINA
DTM*139*20170825*0700*LT
SE*21*355750042
GE*1*935575
IEA*1*000935576
```

FIG. 2A

```
201
{
  "transaction_header": {
    "edi_receiver_code": "ANONYMIZED",
    "edi_sender_code": "MAERSKLINE",
    "edi_time": "201707080430",
    "edi_type": InputStandard.x12,
    "edi_transaction_code": "315",
    "edi_transaction_version": "004010",
    "edi_group_id": "935575",
    "edi_transaction_control_number": "3557500042",
    "edi_envelop_hash": "b9a6ef",
  },
  "status_code": "I",
  "vessel": {
    "code": "9252541",
    "code_qualifier": "L",
    "name": "NORTHERN MAGNUM"
  },
  "status_time": "201707011824",
  "ingestion_file_hash": "x12_315_transshipment.edi",
  "object_type": "container_status",
  "container": {
    "number": "CAIU8395465",
    "container_type": {
      "code": "4310"
    }
  },
  "vessel_voyage_code": "1706",
  "point": {
    "carrier_reference_code": None, "detail_time": "201707011824",
        "detail_time_type": "140",
        "localized": "LT",
        "detail_code": "R",
        "point": {
          "code": "INNSA",
          "code_qualifier": "UN"
        }
      },
      {
        "detail_time": "201707100600",
        "detail_time_type": "139",
        "localized": "LT",
        "detail_code": "L",
        "point": {
          "code": "INNSA",
          "code_qualifier": "UN"
        }
      },
      {
        "detail_time": "201707230800",
        "detail_time_type": "139",
        "localized": "LT",
        "detail_code": "Y",
        "point": {
          "code": "ESALG",
          "code_qualifier": "UN"
        }
      },
```

FIG. 2B

```
{
    "detail_time": "201707270800",
    "detail_time_type": "139",
    "localized": "LT",
    "detail_code": "Y",
    "point": {
        "code": "COBUN",
        "code_qualifier": "UN"
    }
},
{
    "detail_time": "201708250700",
    "detail_time_type": "139",
    "localized": "LT",
    "detail_code": "1",
    "point": {
        "code": "CLSAI",
        "code_qualifier": "UN"
    }
},
{
    "detail_time": "201708250700",
    "detail_time_type": "139",
    "localized": "LT",
    "detail_code": "E",
    "point": {
        "code": "CLSAI",
        "code_qualifier": "UN"
    }
}
],
}
```

```
"code": "INNSA"
"code_qualifier": "UN"
},
"is_loaded": "L",
"refs": [
    {
        "reference_number": "6053360588",
        "reference_code": "BN"
    },
    {
        "reference_number": "2221517",
        "reference_code": "CT"
    },
    {
        "reference_number": "MAEU6053360588",
        "reference_code": "BM"
    }
],
"transport_point_details": [
    {
        "detail_time": "201707011824",
        "detail_time_type": "140",
        "localized": "LT",
        "detail_code": "I",
        "point": {
            "code": "INNSA",
            "code_qualifier": "UN"
        }
    },
```

FIG. 2B (Cont.)

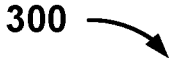
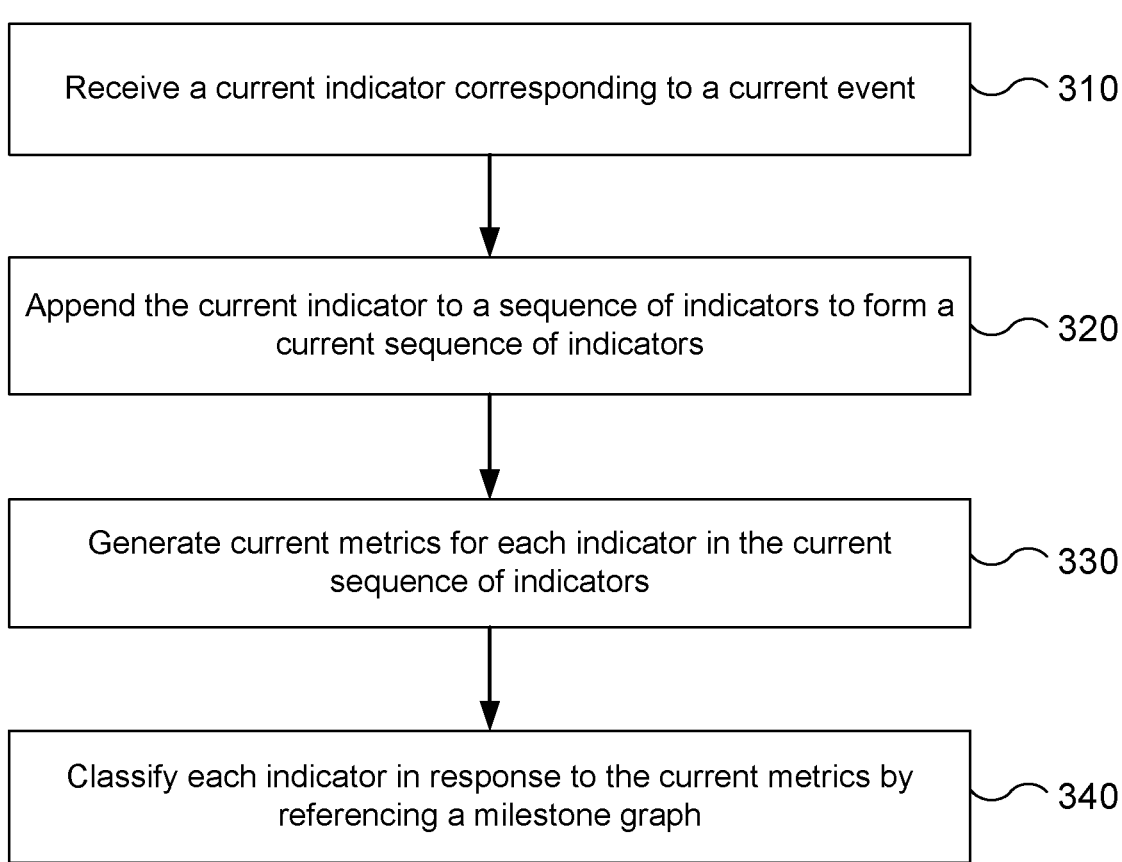
300
| Receive a current indicator corresponding to a current event | 310 |
| Append the current indicator to a sequence of indicators to form a current sequence of indicators | 320 |
| Generate current metrics for each indicator in the current sequence of indicators | 330 |
| Classify each indicator in response to the current metrics by referencing a milestone graph | 340 |
FIG. 3A

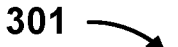

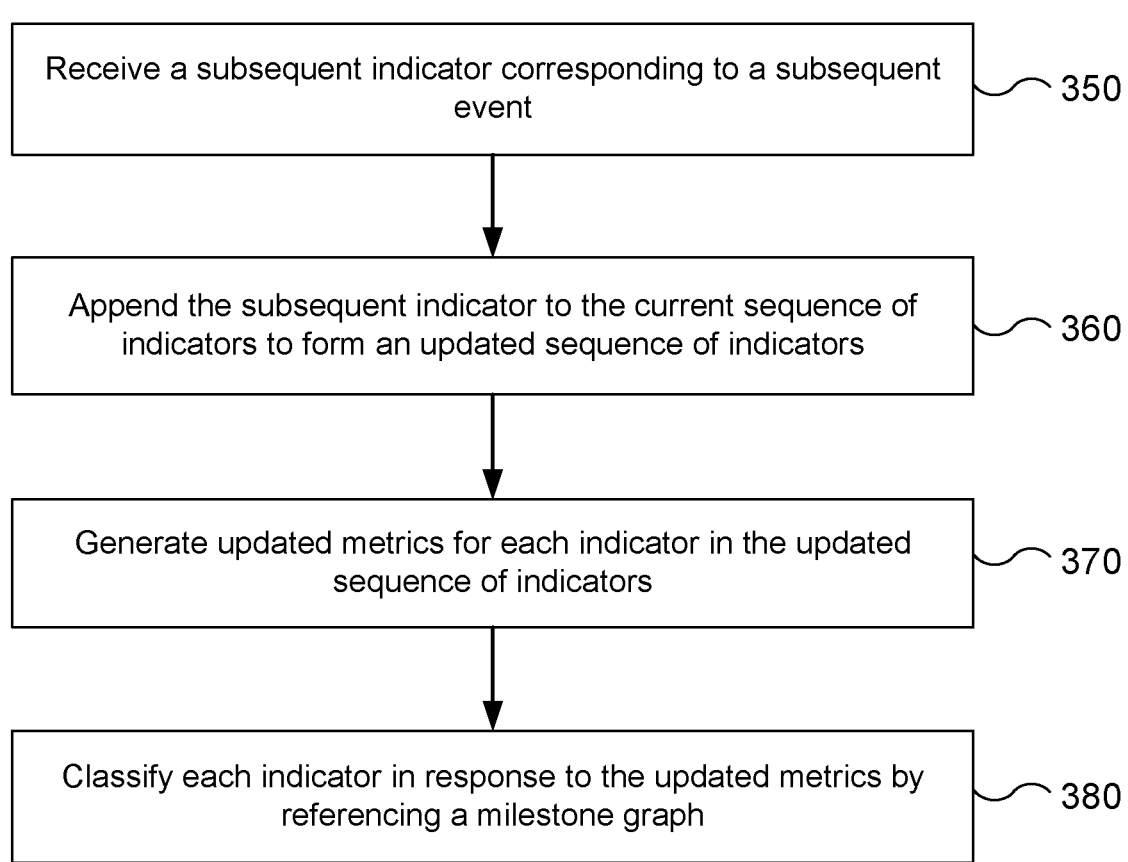

301

Receive a subsequent indicator corresponding to a subsequent event     350

Append the subsequent indicator to the current sequence of indicators to form an updated sequence of indicators     360

Generate updated metrics for each indicator in the updated sequence of indicators     370

Classify each indicator in response to the updated metrics by referencing a milestone graph     380

FIG. 3B

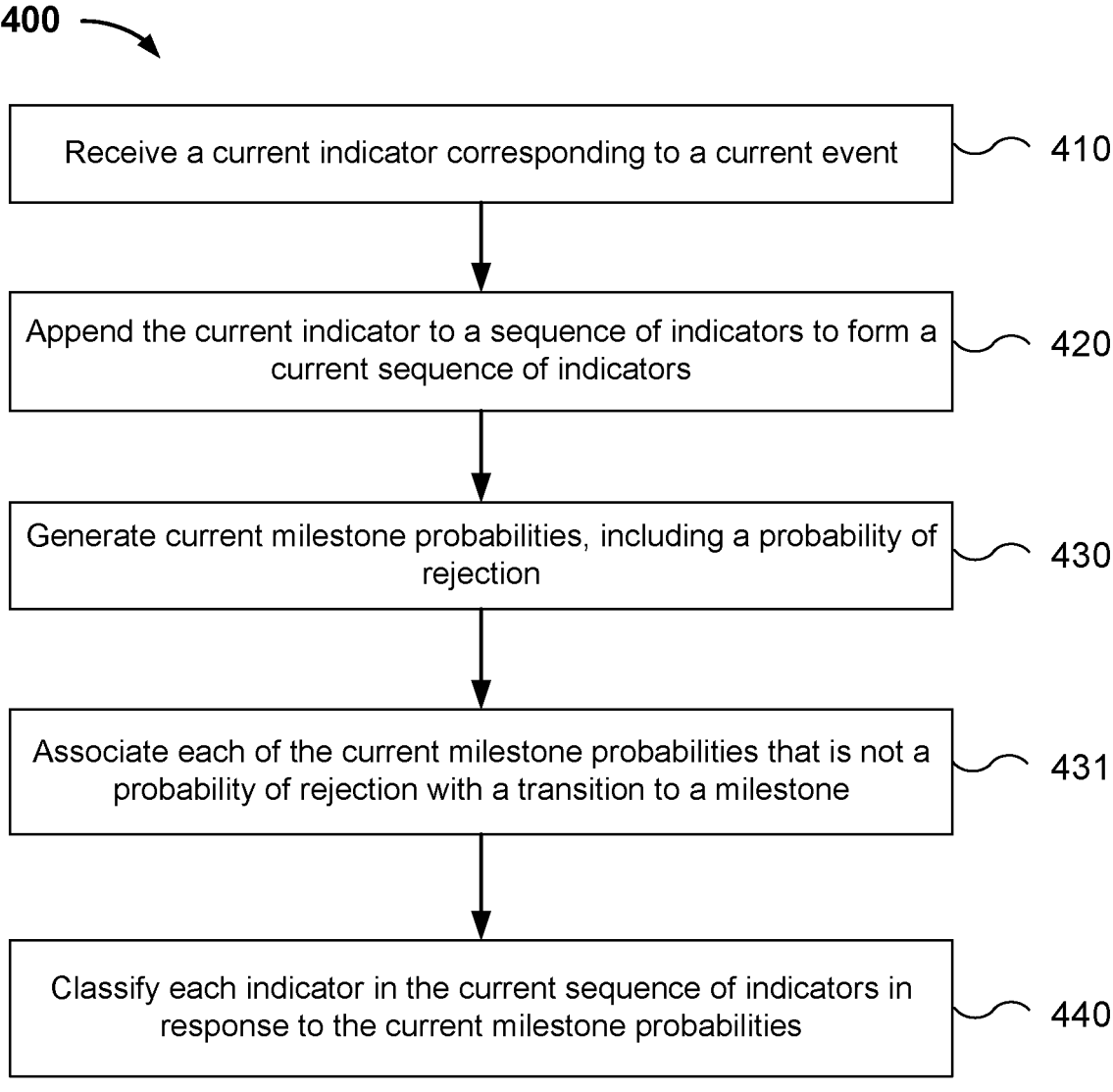

400

Receive a current indicator corresponding to a current event — 410

Append the current indicator to a sequence of indicators to form a current sequence of indicators — 420

Generate current milestone probabilities, including a probability of rejection — 430

Associate each of the current milestone probabilities that is not a probability of rejection with a transition to a milestone — 431

Classify each indicator in the current sequence of indicators in response to the current milestone probabilities — 440

FIG. 4A

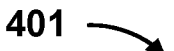

401

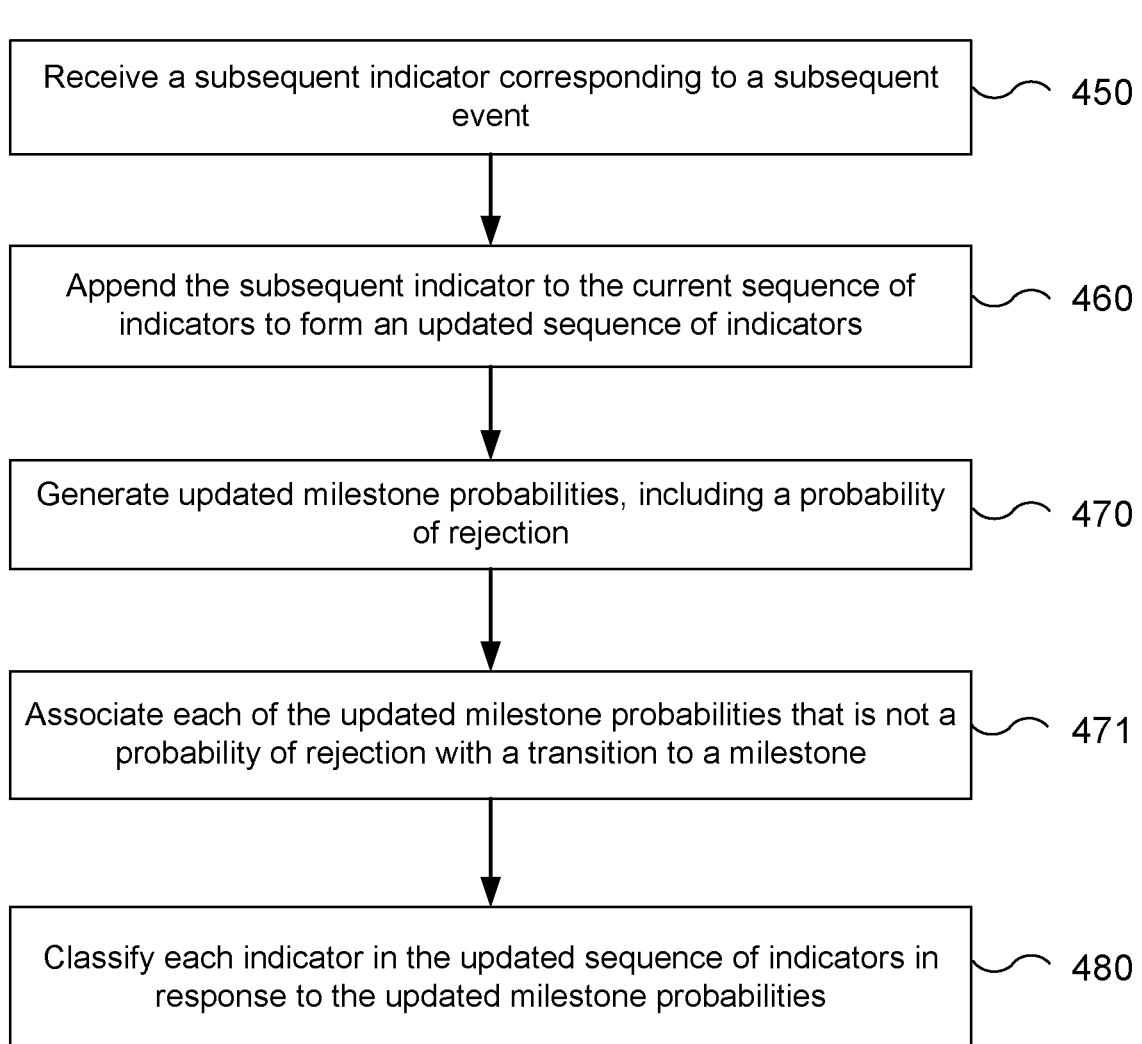

| Receive a subsequent indicator corresponding to a subsequent event | 450 |

| Append the subsequent indicator to the current sequence of indicators to form an updated sequence of indicators | 460 |

| Generate updated milestone probabilities, including a probability of rejection | 470 |

| Associate each of the updated milestone probabilities that is not a probability of rejection with a transition to a milestone | 471 |

| Classify each indicator in the updated sequence of indicators in response to the updated milestone probabilities | 480 |

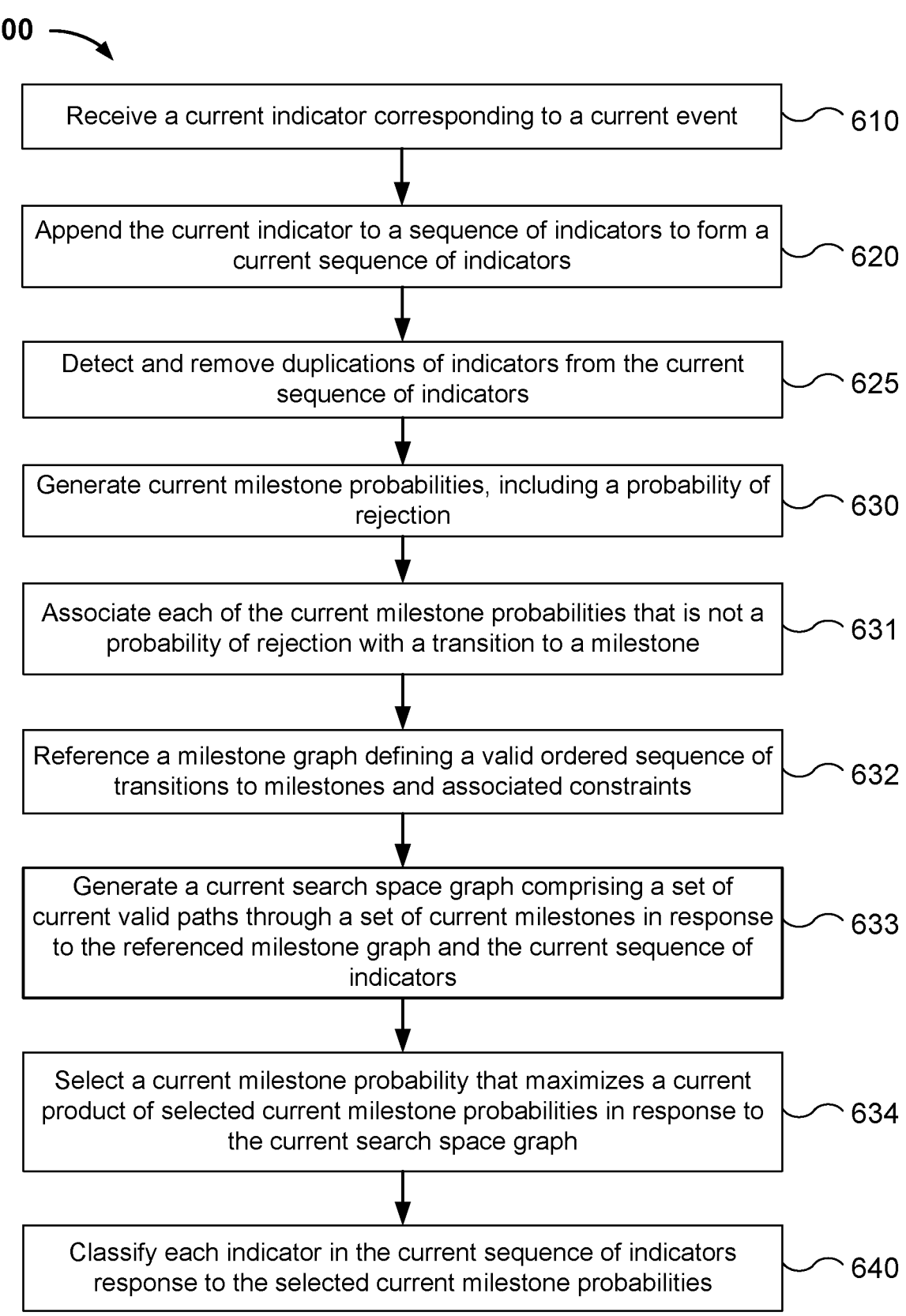

600

| | |
|---|---|
| Receive a current indicator corresponding to a current event | 610 |
| Append the current indicator to a sequence of indicators to form a current sequence of indicators | 620 |
| Detect and remove duplications of indicators from the current sequence of indicators | 625 |
| Generate current milestone probabilities, including a probability of rejection | 630 |
| Associate each of the current milestone probabilities that is not a probability of rejection with a transition to a milestone | 631 |
| Reference a milestone graph defining a valid ordered sequence of transitions to milestones and associated constraints | 632 |
| Generate a current search space graph comprising a set of current valid paths through a set of current milestones in response to the referenced milestone graph and the current sequence of indicators | 633 |
| Select a current milestone probability that maximizes a current product of selected current milestone probabilities in response to the current search space graph | 634 |
| Classify each indicator in the current sequence of indicators response to the selected current milestone probabilities | 640 |

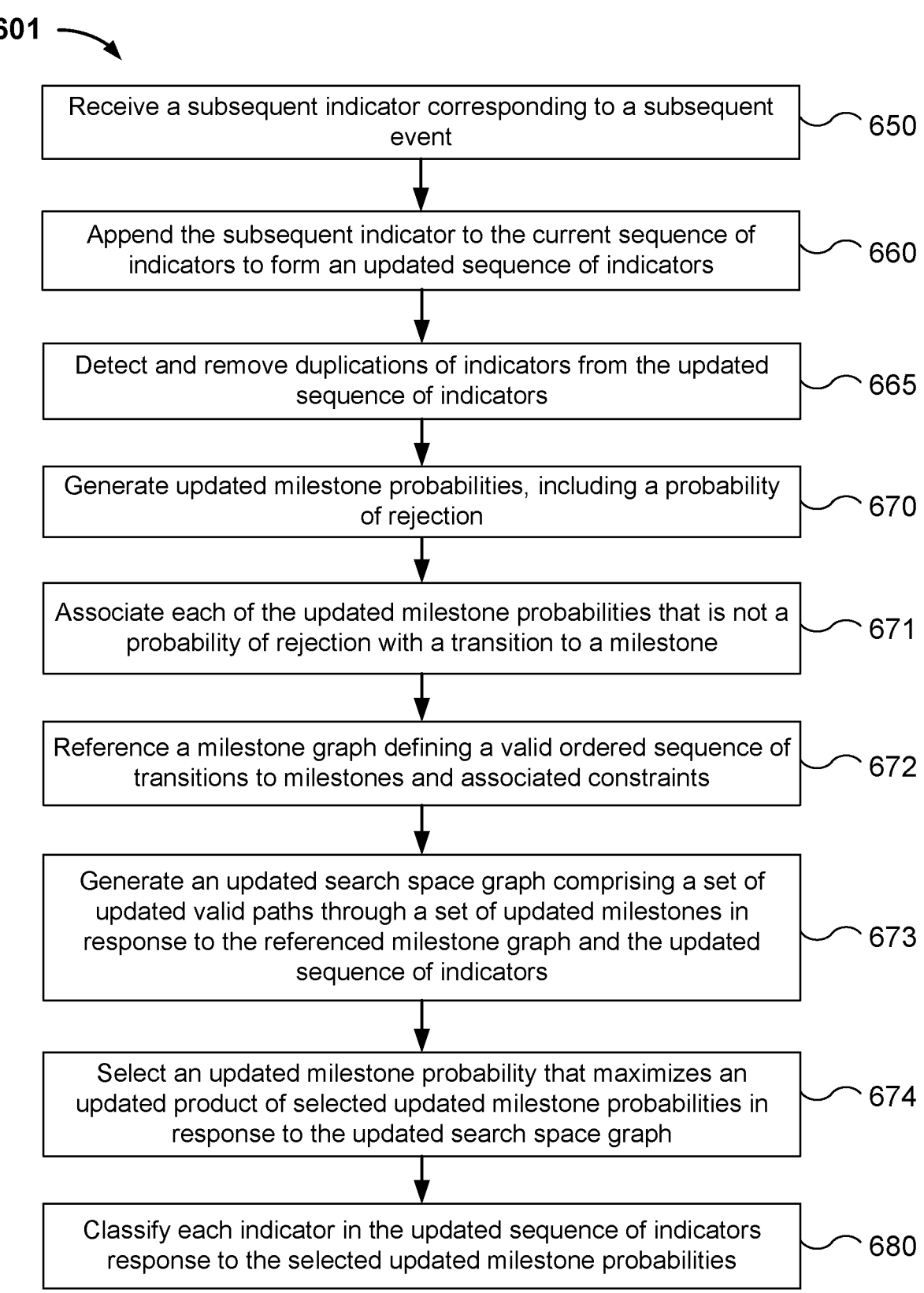

Receive a subsequent indicator corresponding to a subsequent event — 650

Append the subsequent indicator to the current sequence of indicators to form an updated sequence of indicators — 660

Detect and remove duplications of indicators from the updated sequence of indicators — 665

Generate updated milestone probabilities, including a probability of rejection — 670

Associate each of the updated milestone probabilities that is not a probability of rejection with a transition to a milestone — 671

Reference a milestone graph defining a valid ordered sequence of transitions to milestones and associated constraints — 672

Generate an updated search space graph comprising a set of updated valid paths through a set of updated milestones in response to the referenced milestone graph and the updated sequence of indicators — 673

Select an updated milestone probability that maximizes an updated product of selected updated milestone probabilities in response to the updated search space graph — 674

Classify each indicator in the updated sequence of indicators response to the selected updated milestone probabilities — 680

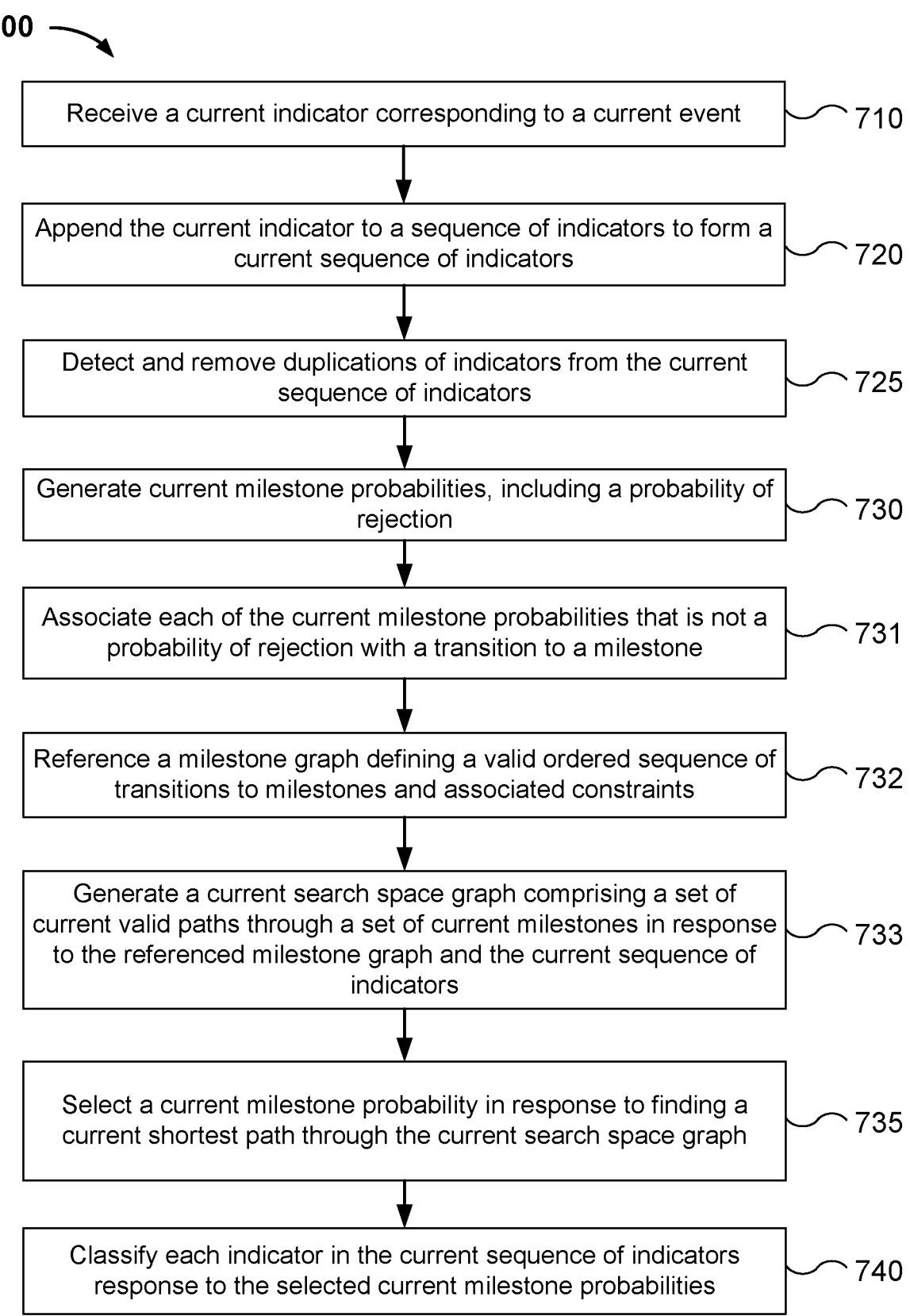

Receive a current indicator corresponding to a current event — 710

Append the current indicator to a sequence of indicators to form a current sequence of indicators — 720

Detect and remove duplications of indicators from the current sequence of indicators — 725

Generate current milestone probabilities, including a probability of rejection — 730

Associate each of the current milestone probabilities that is not a probability of rejection with a transition to a milestone — 731

Reference a milestone graph defining a valid ordered sequence of transitions to milestones and associated constraints — 732

Generate a current search space graph comprising a set of current valid paths through a set of current milestones in response to the referenced milestone graph and the current sequence of indicators — 733

Select a current milestone probability in response to finding a current shortest path through the current search space graph — 735

Classify each indicator in the current sequence of indicators response to the selected current milestone probabilities — 740

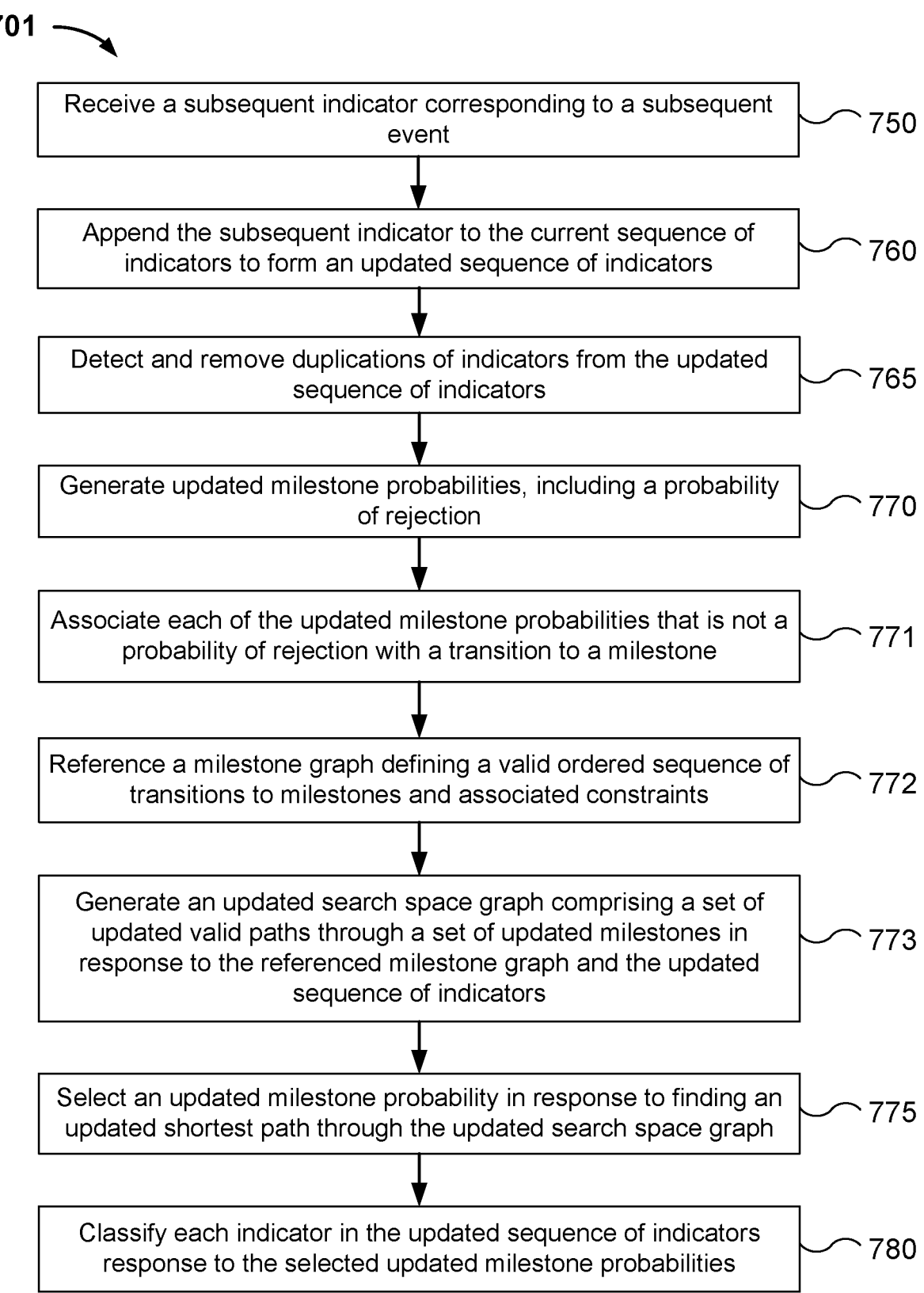

Receive a subsequent indicator corresponding to a subsequent event ⟋⟍ 750

Append the subsequent indicator to the current sequence of indicators to form an updated sequence of indicators ⟋⟍ 760

Detect and remove duplications of indicators from the updated sequence of indicators ⟋⟍ 765

Generate updated milestone probabilities, including a probability of rejection ⟋⟍ 770

Associate each of the updated milestone probabilities that is not a probability of rejection with a transition to a milestone ⟋⟍ 771

Reference a milestone graph defining a valid ordered sequence of transitions to milestones and associated constraints ⟋⟍ 772

Generate an updated search space graph comprising a set of updated valid paths through a set of updated milestones in response to the referenced milestone graph and the updated sequence of indicators ⟋⟍ 773

Select an updated milestone probability in response to finding an updated shortest path through the updated search space graph ⟋⟍ 775

Classify each indicator in the updated sequence of indicators response to the selected updated milestone probabilities ⟋⟍ 780

FIG. 7B

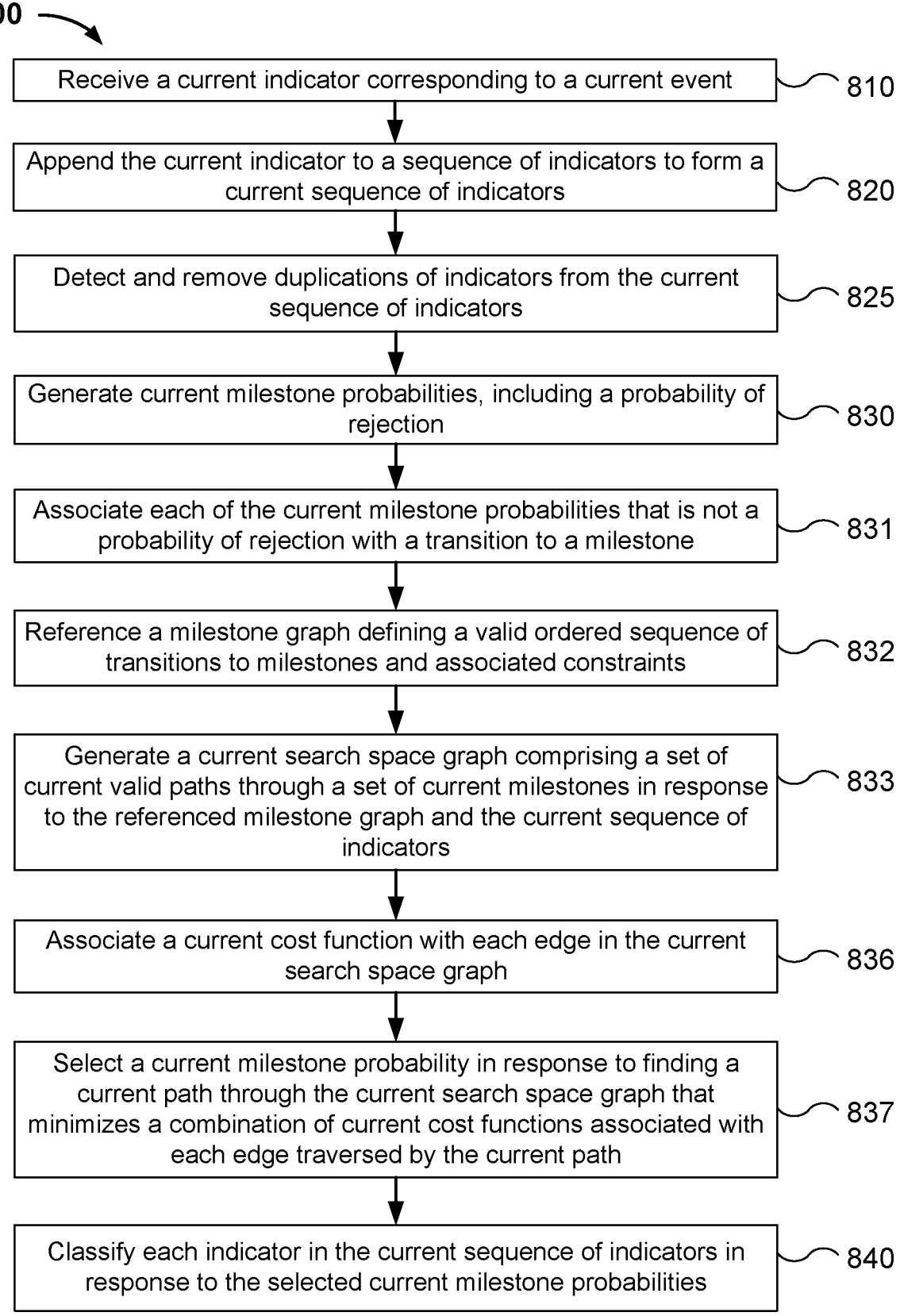

800

Receive a current indicator corresponding to a current event    810

Append the current indicator to a sequence of indicators to form a current sequence of indicators    820

Detect and remove duplications of indicators from the current sequence of indicators    825

Generate current milestone probabilities, including a probability of rejection    830

Associate each of the current milestone probabilities that is not a probability of rejection with a transition to a milestone    831

Reference a milestone graph defining a valid ordered sequence of transitions to milestones and associated constraints    832

Generate a current search space graph comprising a set of current valid paths through a set of current milestones in response to the referenced milestone graph and the current sequence of indicators    833

Associate a current cost function with each edge in the current search space graph    836

Select a current milestone probability in response to finding a current path through the current search space graph that minimizes a combination of current cost functions associated with each edge traversed by the current path    837

Classify each indicator in the current sequence of indicators in response to the selected current milestone probabilities    840

FIG. 8A

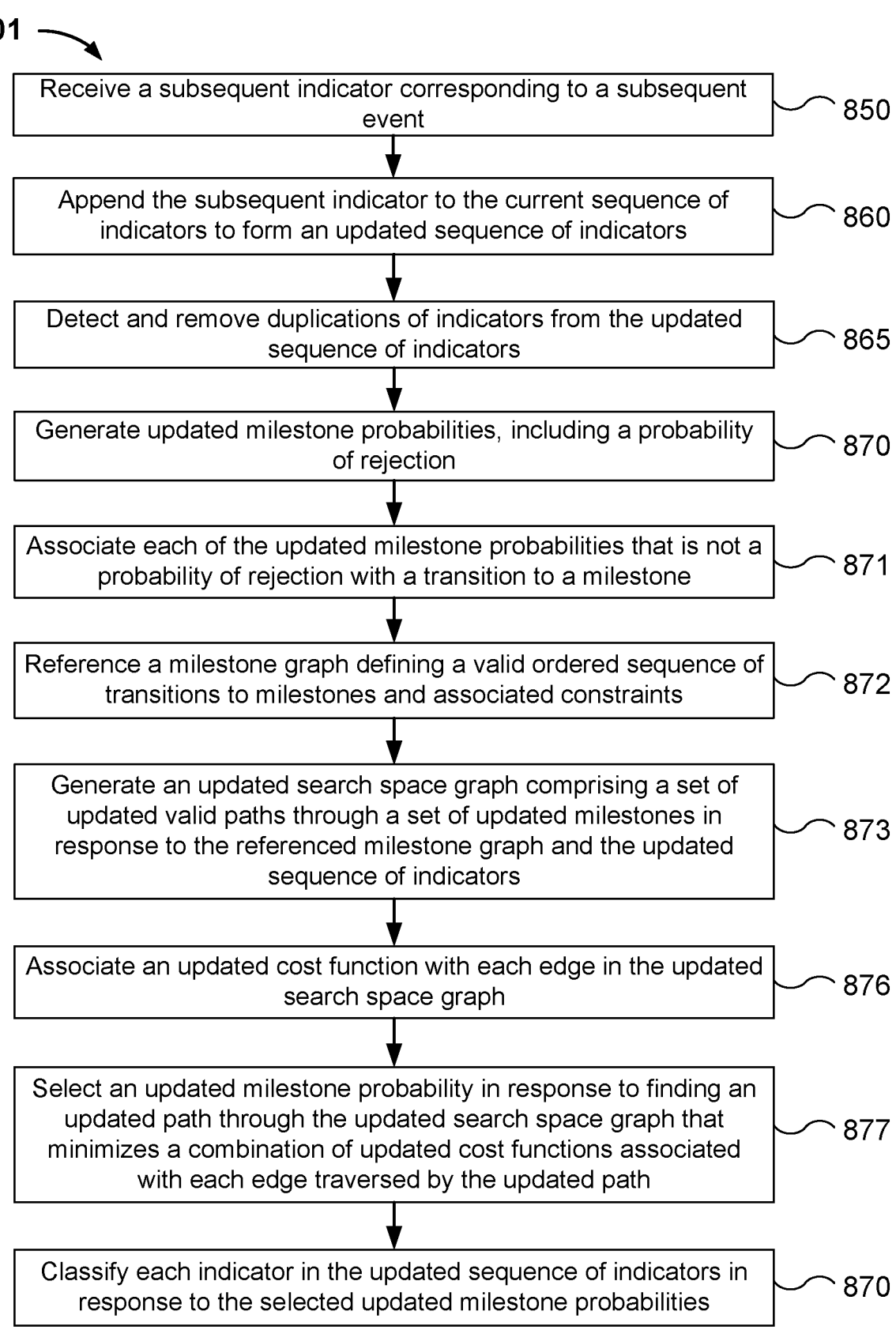

801

Receive a subsequent indicator corresponding to a subsequent event — 850

Append the subsequent indicator to the current sequence of indicators to form an updated sequence of indicators — 860

Detect and remove duplications of indicators from the updated sequence of indicators — 865

Generate updated milestone probabilities, including a probability of rejection — 870

Associate each of the updated milestone probabilities that is not a probability of rejection with a transition to a milestone — 871

Reference a milestone graph defining a valid ordered sequence of transitions to milestones and associated constraints — 872

Generate an updated search space graph comprising a set of updated valid paths through a set of updated milestones in response to the referenced milestone graph and the updated sequence of indicators — 873

Associate an updated cost function with each edge in the updated search space graph — 876

Select an updated milestone probability in response to finding an updated path through the updated search space graph that minimizes a combination of updated cost functions associated with each edge traversed by the updated path — 877

Classify each indicator in the updated sequence of indicators in response to the selected updated milestone probabilities — 870

FIG. 8B

900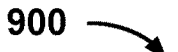

| Trip Segment | Mode or stage | Physical Event | Milestone | Status Code |
|---|---|---|---|---|
| Stuffing | | Empty dispatch | M1 | EE, OA |
| | | Receipt | M2 | I, AR, CO |
| Export Inland Activity | Drayage | Export drayage depart | M3 | OA |
| | | Export drayage arrive | M4 | I |
| | Rail | Export rail load | M5 | AL |
| | | Export rail depart | M6 | RL |
| | | Export rail arrive | M7 | I |
| | | Export rail unload | M8 | UR |
| | Barge | Export barge load | M9 | AO |
| | | Export barge depart | M10 | |
| | | Export barge arrive | M11 | |
| | | Export barge unload | M12 | UO |
| Vessel Activity | Load to Vessel | Vessel load origin | M13 | AE |
| | | Vessel depart origin | M14 | VD |
| | Arrival | Vessel arrive transshipment | M15 | VA |
| | | Vessel discharge transshipment | M16 | UV |
| | Drayage | Transshipment drayage depart | M17 | OA |
| | | Transshipment drayage arrive | M18 | I |
| | Departure | Vessel load transshipment | M19 | AE, AP |
| | | Vessel depart transshipment | M20 | VD |
| | Unload from Vessel | Vessel arrive destination | M21 | VA |
| | | Vessel discharge destination | M22 | UV |
| Import Inland Activity | Drayage | Import drayage depart | M23 | AM, OA |
| | | Import drayage arrive | M24 | I, RD |
| | Rail | Import rail load | M25 | AL |
| | | Import rail depart | M26 | RL |
| | | Import rail arrive | M27 | I, AR |
| | | Import rail unload | M28 | UR |
| | Barge | Import barge load | M29 | AO |
| | | Import barge depart | M30 | |
| | | Import barge arrive | M31 | |
| | | Import barge unload | M32 | UO |
| Unstuffing | | Available for delivery | M33 | AV |
| | | Out for delivery | M34 | AM, OA |
| | | At delivery location | M35 | D |
| | | Empty return | M36 | I, RD |

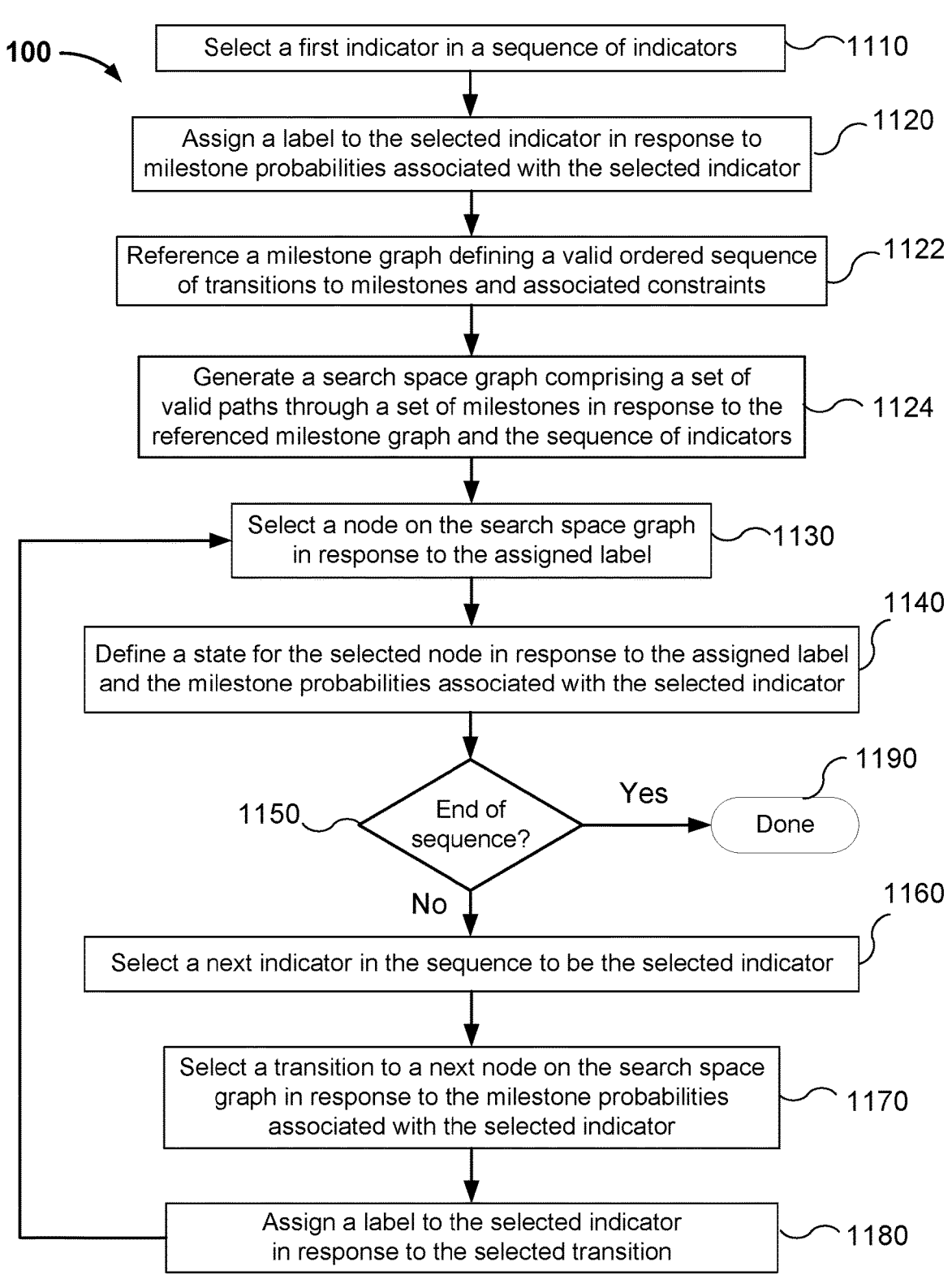

1100

Select a first indicator in a sequence of indicators 1110

Assign a label to the selected indicator in response to milestone probabilities associated with the selected indicator 1120

Reference a milestone graph defining a valid ordered sequence of transitions to milestones and associated constraints 1122

Generate a search space graph comprising a set of valid paths through a set of milestones in response to the referenced milestone graph and the sequence of indicators 1124

Select a node on the search space graph in response to the assigned label 1130

Define a state for the selected node in response to the assigned label and the milestone probabilities associated with the selected indicator 1140

1150 End of sequence? — Yes → Done 1190

No

Select a next indicator in the sequence to be the selected indicator 1160

Select a transition to a next node on the search space graph in response to the milestone probabilities associated with the selected indicator 1170

Assign a label to the selected indicator in response to the selected transition 1180

FIG. 11

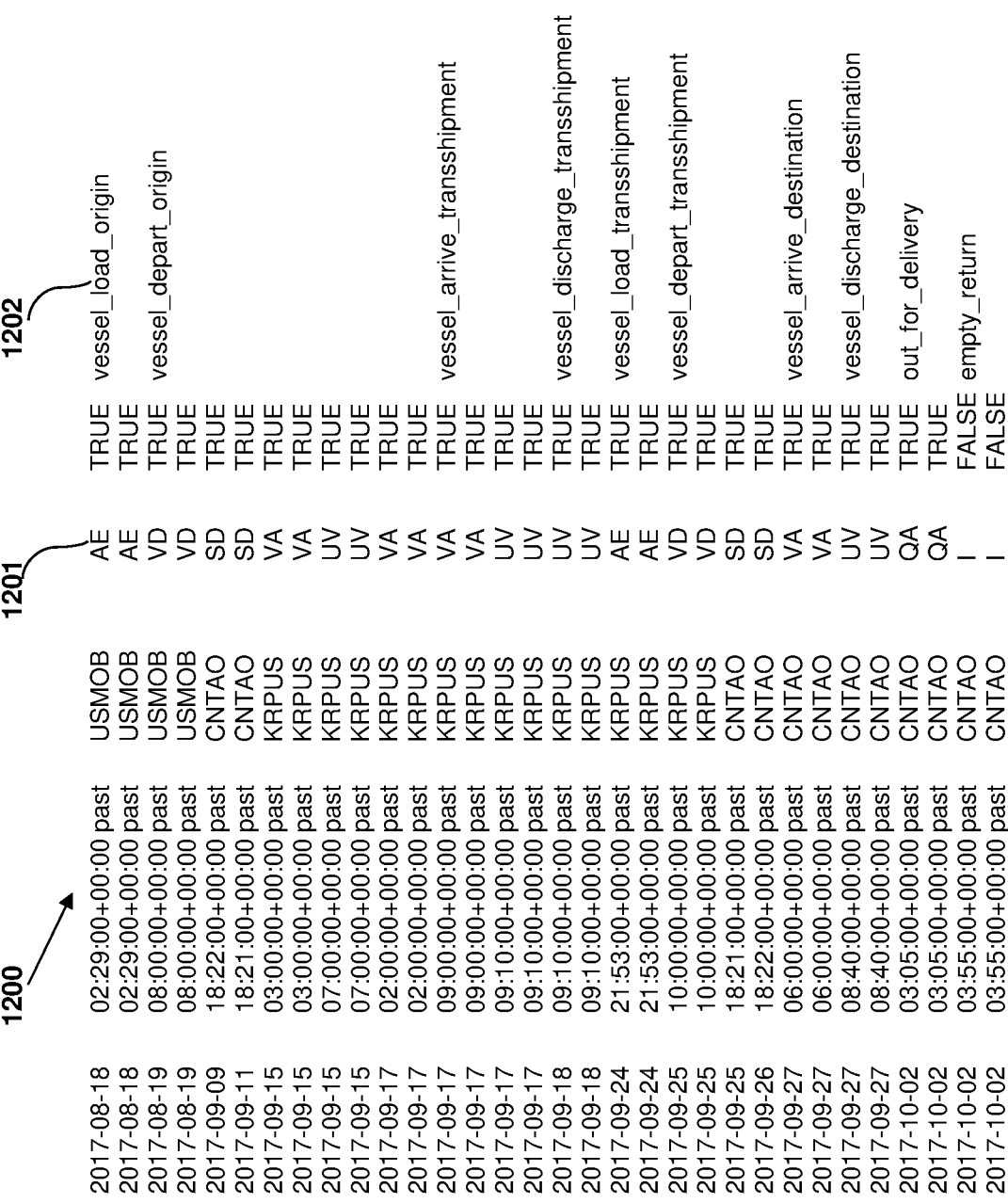

| | | | | | |
|---|---|---|---|---|---|
| 1200 | | | 1201 | 1202 | |
| 2017-08-18 | 02:29:00+00:00 past | USMOB | AE | TRUE | vessel_load_origin |
| 2017-08-18 | 02:29:00+00:00 past | USMOB | AE | TRUE | |
| 2017-08-19 | 08:00:00+00:00 past | USMOB | VD | TRUE | vessel_depart_origin |
| 2017-08-19 | 08:00:00+00:00 past | USMOB | VD | TRUE | |
| 2017-09-09 | 18:22:00+00:00 past | CNTAO | SD | TRUE | |
| 2017-09-09 | 18:21:00+00:00 past | CNTAO | SD | TRUE | |
| 2017-09-11 | 03:00:00+00:00 past | KRPUS | VA | TRUE | |
| 2017-09-15 | 03:00:00+00:00 past | KRPUS | VA | TRUE | |
| 2017-09-15 | 07:00:00+00:00 past | KRPUS | UV | TRUE | |
| 2017-09-15 | 07:00:00+00:00 past | KRPUS | UV | TRUE | |
| 2017-09-17 | 02:00:00+00:00 past | KRPUS | VA | TRUE | |
| 2017-09-17 | 02:00:00+00:00 past | KRPUS | VA | TRUE | |
| 2017-09-17 | 09:00:00+00:00 past | KRPUS | VA | TRUE | vessel_arrive_transshipment |
| 2017-09-17 | 09:00:00+00:00 past | KRPUS | VA | TRUE | |
| 2017-09-17 | 09:10:00+00:00 past | KRPUS | UV | TRUE | |
| 2017-09-17 | 09:10:00+00:00 past | KRPUS | UV | TRUE | vessel_discharge_transshipment |
| 2017-09-18 | 09:10:00+00:00 past | KRPUS | UV | TRUE | |
| 2017-09-18 | 09:10:00+00:00 past | KRPUS | UV | TRUE | vessel_load_transshipment |
| 2017-09-24 | 21:53:00+00:00 past | KRPUS | AE | TRUE | |
| 2017-09-24 | 21:53:00+00:00 past | KRPUS | AE | TRUE | |
| 2017-09-25 | 10:00:00+00:00 past | KRPUS | VD | TRUE | vessel_depart_transshipment |
| 2017-09-25 | 10:00:00+00:00 past | KRPUS | VD | TRUE | |
| 2017-09-25 | 18:21:00+00:00 past | CNTAO | SD | TRUE | |
| 2017-09-26 | 18:22:00+00:00 past | CNTAO | SD | TRUE | |
| 2017-09-27 | 06:00:00+00:00 past | CNTAO | VA | TRUE | vessel_arrive_destination |
| 2017-09-27 | 06:00:00+00:00 past | CNTAO | VA | TRUE | |
| 2017-09-27 | 08:40:00+00:00 past | CNTAO | UV | TRUE | vessel_discharge_destination |
| 2017-09-27 | 08:40:00+00:00 past | CNTAO | UV | TRUE | |
| 2017-10-02 | 03:05:00+00:00 past | CNTAO | QA | TRUE | out_for_delivery |
| 2017-10-02 | 03:05:00+00:00 past | CNTAO | QA | TRUE | |
| 2017-10-02 | 03:55:00+00:00 past | CNTAO | I | FALSE | empty_return |
| 2017-10-02 | 03:55:00+00:00 past | CNTAO | I | FALSE | |

FIG. 12

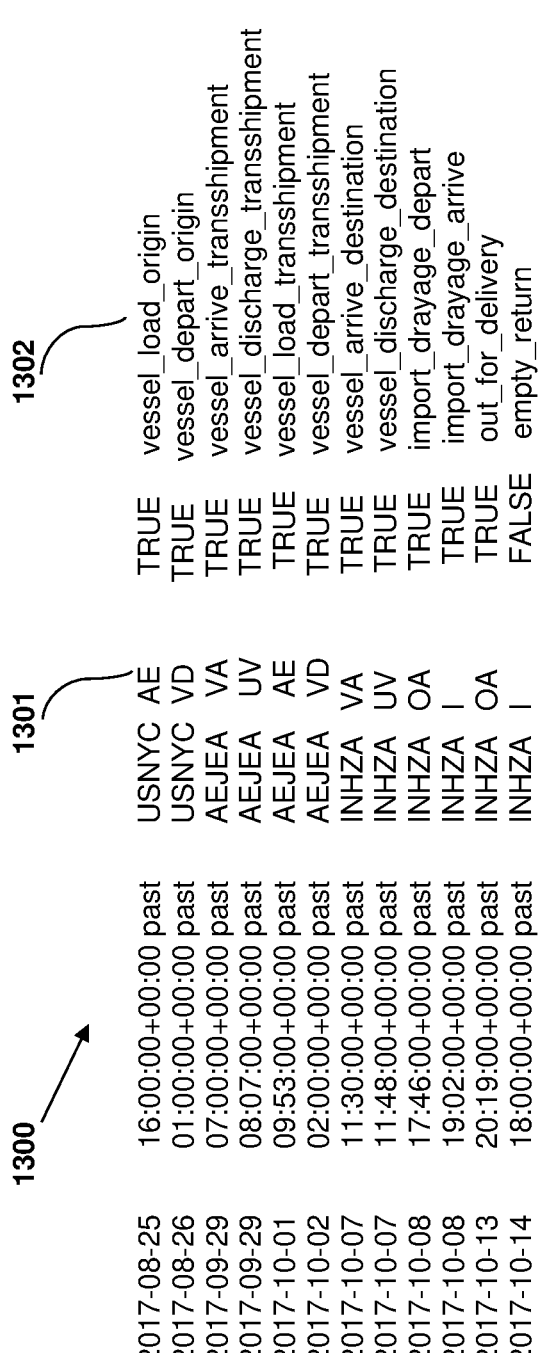

1300

1301

1302

| | | | | | |
|---|---|---|---|---|---|
| 2017-08-25 | 16:00:00+00:00 | past | USNYC | AE | TRUE | vessel_load_origin |
| 2017-08-26 | 01:00:00+00:00 | past | USNYC | VD | TRUE | vessel_depart_origin |
| 2017-09-29 | 07:00:00+00:00 | past | AEJEA | VA | TRUE | vessel_arrive_transshipment |
| 2017-09-29 | 08:07:00+00:00 | past | AEJEA | UV | TRUE | vessel_discharge_transshipment |
| 2017-10-01 | 09:53:00+00:00 | past | AEJEA | AE | TRUE | vessel_load_transshipment |
| 2017-10-02 | 02:00:00+00:00 | past | AEJEA | VD | TRUE | vessel_depart_transshipment |
| 2017-10-07 | 11:30:00+00:00 | past | INHZA | VA | TRUE | vessel_arrive_destination |
| 2017-10-07 | 11:48:00+00:00 | past | INHZA | UV | TRUE | vessel_discharge_destination |
| 2017-10-08 | 17:46:00+00:00 | past | INHZA | OA | TRUE | import_drayage_depart |
| 2017-10-08 | 19:02:00+00:00 | past | INHZA | I_ | TRUE | import_drayage_arrive |
| 2017-10-13 | 20:19:00+00:00 | past | INHZA | OA | TRUE | out_for_delivery |
| 2017-10-14 | 18:00:00+00:00 | past | INHZA | I_ | FALSE | empty_return |

FIG. 13

CLASSIFICATION AND TRANSFORMATION OF SEQUENTIAL EVENT DATA

CROSS-REFERENCE TO RELATED APPLICATIONS

This application is a continuation application of U.S. patent application Ser. No. 17/955,817 (now U.S. Pat. No. 11,907,866), filed Sep. 29, 2022, which is a continuation application of U.S. patent application Ser. No. 15/965,540 (now U.S. Pat. No. 11,488,044), filed Apr. 27, 2018. These applications are fully incorporated herein by reference in their entireties.

BACKGROUND OF THE INVENTION

Data generated and used to track a series of events of interest is often in a form that is not particularly meaningful to an end user. For example, although sequential raw data generated and corresponding to a series of events may actually contain important information regarding each particular event, that information is not readily apparent or discernable from the generated data and must be extracted and transformed to provide meaning to an end user. In addition, there are other reasons why relying on generated sequential event data is problematic. The data may contain errors, be duplicative, or in the case of sequential data, certain files may be received out of order or may be missing entirely. This creates issues where the order of events itself has meaning making it critical to identify the proper sequential order of the data corresponding to each event in the series.

BRIEF DESCRIPTION OF THE DRAWINGS

Various embodiments of the invention are disclosed in the following detailed description and the accompanying drawings.

FIG. 1B is a flowchart showing steps in an exemplary process performed by the system of FIG. 1A.

FIG. 2A shows an example of an EDI file received in a raw data format.

FIG. 2B shows an example of a JSON object resulting from parsing and converting the EDI file of FIG. 2A.

FIG. 3A shows a flowchart depicting an exemplary method for processing events that can be performed by the system of FIG. 1A, as triggered by receiving a current indicator corresponding to a current event.

FIG. 3B shows a flowchart depicting an exemplary method for processing events that can be performed by the system of FIG. 1A, as triggered by receiving a subsequent indicator corresponding to a subsequent event.

FIG. 4A shows a flowchart depicting another exemplary method for processing events performed by the system of FIG. 1A, as triggered by receiving a current indicator corresponding to a current event.

FIG. 4B shows a flowchart depicting another exemplary method for processing events performed by the system of FIG. 1A, as triggered by receiving a subsequent indicator corresponding to a subsequent event.

FIG. 6A shows a flowchart depicting an exemplary method that references a milestone graph and generates a current search space graph for classifying events as triggered by receiving a current indicator corresponding to a current event.

FIG. 6B shows a flowchart depicting an exemplary method that references a milestone graph and generates an updated search space graph for classifying events as triggered by receiving a subsequent indicator corresponding to a subsequent event.

FIG. 7A shows a flowchart depicting an exemplary method that includes finding a shortest path through a current search space graph to select current milestone probabilities for classifying events as triggered by receiving a current indicator corresponding to a current event.

FIG. 7B shows a flowchart depicting an exemplary method that includes finding a shortest path through an updated search space graph to select updated milestone probabilities for classifying events as triggered by receiving a subsequent indicator corresponding to a subsequent event.

FIG. 8A shows a flowchart depicting an exemplary method that includes using cost functions applied to a current search space graph to select current milestone probabilities for classifying events as triggered by receiving a current indicator corresponding to a current event.

FIG. 8B shows a flowchart depicting an exemplary method that includes using cost functions applied to an updated search space graph to select updated milestone probabilities for classifying events as triggered by receiving a subsequent indicator corresponding to a subsequent event.

FIG. 9 shows a table providing a view of how a container's journey may be logically broken up into trip segments, modes or stages, descriptions of physical events corresponding to the different modes or stages that define container milestones associated with container movement, and the status codes that may be mapped to each container milestone.

FIG. 11 is a flowchart showing an exemplary process performed by an exemplary system such as the system of FIG. 1A for classifying each indicator in a sequence of indicators by referencing a milestone graph and generating a search space graph in response to the referenced milestone graph and the sequence of indicators.

FIG. 12 shows a screenshot depicting an exemplary sequence of status codes contained in a sequence of messages received for a shipping container and a sequence of predicted milestones corresponding to each status code.

FIG. 13 shows a screenshot of a classification result from an exemplary system applied to tracking a shipping container.

DETAILED DESCRIPTION

Figure 1A:
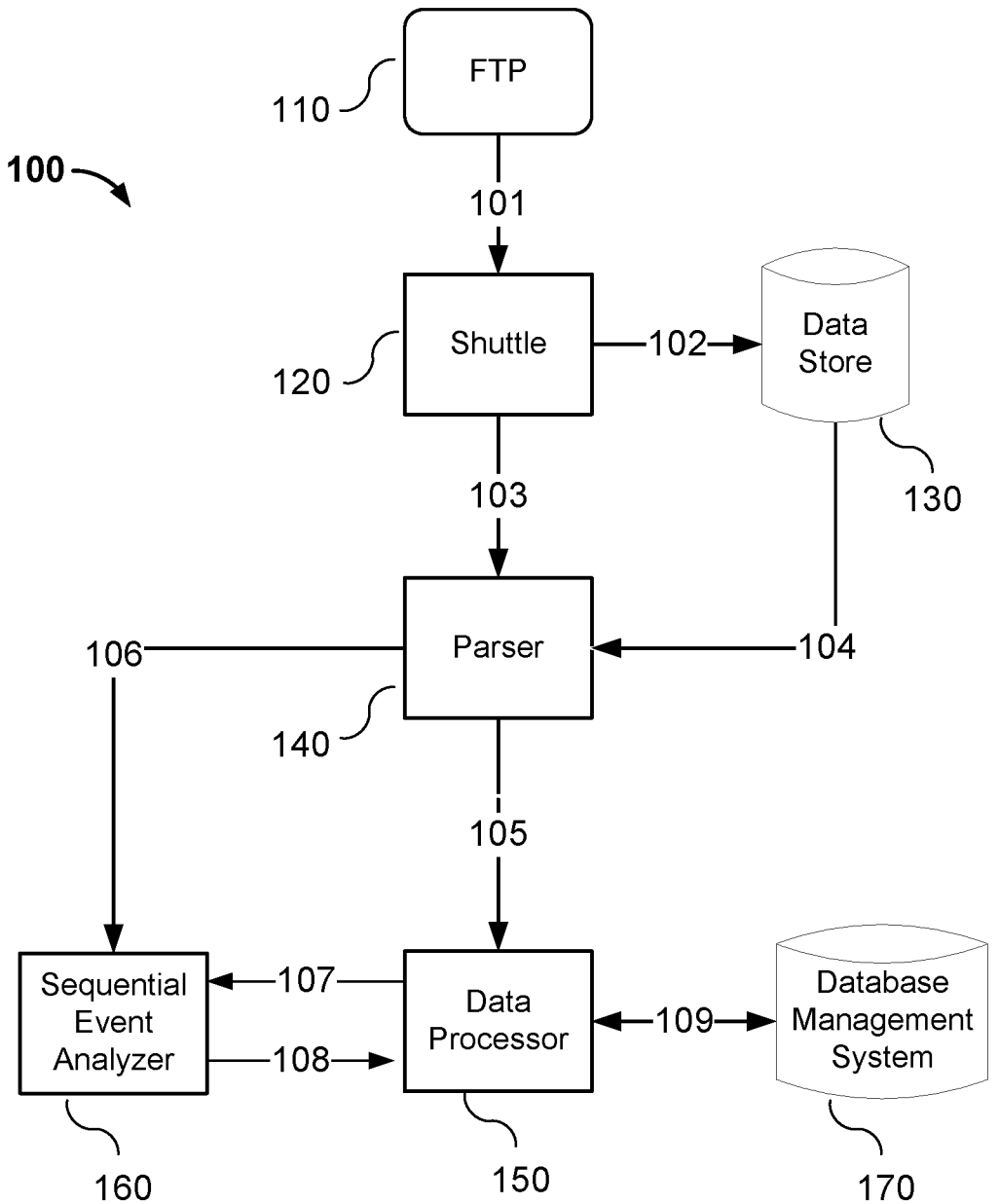
FIG. 1A is a block diagram showing an embodiment of an exemplary system as disclosed herein for processing events.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Relying on generated sequential event data in its raw, unprocessed form to track a series of events poses a number of problems. First, despite the fact that the data contains useful information, the form in which it is typically generated or received is not particularly meaningful to an end user. For any given application, useful information must be extracted and transformed to provide meaning and utility to the end user. Second, the data may contain errors, be duplicative, or in the case of sequential data, certain data files may be received out of order or may be missing entirely. This creates issues in applications where the order of events itself is important to identify and to preserve.

Accordingly, a method and system are provided that apply a combination of machine learning and graph techniques to classify and transform sequential event data. In particular, data can be generated or obtained for each event in a sequence of events ordered in time. These events can be physical events, administrative events, or other types of events that are ordered in time to form a sequence of events. In some embodiments, the disclosed method and system are applied in predictive applications, including for example, predicting the actual status of a shipping container in the shipping industry based on generic status codes and other raw data. In such embodiments, the disclosed method and system are applied to generated raw data in the shipping industry to automatically classify a sequence of status codes extracted from EDI data files corresponding to a series of physical events experienced by a shipping container to a sequence of meaningful milestones. This classification into milestones provides improved visibility regarding the actual status of the shipping container.

In some examples, an unconventional approach as described herein uses machine learning techniques to classify each status code in isolation in combination with graph techniques for applying physical real-world constraints to the problem. This unconventional approach provides several advantages and benefits over current approaches in the industry, which typically rely on the use of customized hard-coded rules to transform status codes into meaningful milestones. The hard-coded rules are often designed manually from scratch to suit each particular application. Not only is this a costly and time-consuming process, but the result is sub-optimal in that the applied rules are not able to adapt and incorporate new information provided by subsequent data points. In contrast to prior art approaches, the disclosed approach can be applied to automatically and nearly instantaneously (as new data is received) determine an optimal result based on the application of constraints using graph techniques as well as the application of other techniques described herein that reduce the complexity of the problem and improve the operation of the computer. Specifically, the disclosed approach improves the efficiency in finding an optimal solution in a tractable manner, which in this case, provides visibility into the actual status of the container.

Although the embodiments described herein relate to applications in the shipping industry, the disclosed method and system are not limited to such applications, but can be applied to classify and transform sequential event data for use in other applications. For example, data aggregators can use the disclosed method and system to provide visibility applications (e.g., in the case of the shipping industry application, to provide visibility as to locations of a shipping container being tracked) that have no predictive component.

More specifically, a system for processing events as disclosed herein includes a processor configured to receive a current indicator corresponding to a current event and append the current indicator to a sequence of indicators. The sequence of indicators includes a series of previously received indicators sequentially ordered in a received order. For example, a sequence of indicators can be formed starting with a first received indicator as a first entry in a series and adding each subsequently received indicator to the end of the series, resulting in a series or sequence of indicators in sequential order. The sequence of indicators corresponds to a series of sequential events and appending the current indicator to the sequence forms a current sequence of indicators. In some embodiments, duplicate instances or duplications of each indicator are detected and removed from the current sequence of indicators, and current metrics for each indicator in the current sequence of indicators are generated. The disclosed system classifies each indicator in the current sequence of indicators in response to the current metrics by referencing a milestone graph and by using a combination of machine learning and graph techniques.

In some embodiments, the disclosed system generates current milestone probabilities including a probability of rejection and associates each of the current milestone probabilities that is not a probability of rejection to a milestone. In these embodiments, the disclosed system references a milestone graph defining a valid ordered sequence of all possible transitions to milestones and associated constraints. In response to the referenced milestone graph, the disclosed system generates a current search space graph comprising a set of current valid paths through a set of current milestones, wherein the set of milestones is determined in response to the current set of indicators. In one example, the disclosed system selects a current milestone probability that maximizes a current product of selected current milestone probabilities in response to the current search space graph. In another example, the disclosed system selects a current milestone probability in response to finding a current shortest path through the current search space graph. In yet another example, the disclosed system associates a current cost function with each edge in the current search space graph and selects a current milestone probability in response to finding a current path through the current search space graph that minimizes a combination of current cost functions associated with each edge traversed by the current path. The disclosed system classifies each indicator in the current sequence of indicators in response to the selected current milestone probabilities. In these examples, the current milestone probability is selected simultaneously for each indicator in the current sequence of indicators.

The process described above for a current indicator is repeated for a subsequent indicator received by the system. In particular, the disclosed system receives a subsequent indicator corresponding to a subsequent event and appends the subsequent indicator to the current sequence of indicators to form an updated sequence of indicators. In some embodiments, the disclosed system removes duplications of each indicator from the updated sequence of indicators and generates updated metrics for each indicator in the updated sequence of indicators. The disclosed system classifies each indicator in the updated sequence of indicators in response to the updated metrics by referencing a milestone graph and by using a combination of machine learning and graph techniques.

In some embodiments, the disclosed system generates updated milestone probabilities including a probability of rejection and associates each of the updated milestone probabilities that is not a probability of rejection to a milestone. In these embodiments, the disclosed system references a milestone graph defining a valid ordered sequence of transitions to milestones and associated constraints. In response to the referenced milestone graph, the disclosed system generates an updated search space graph comprising a set of updated valid paths through a set of updated milestones, wherein the set of updated milestones is determined in response to the updated set of indicators. In one example, the disclosed system selects an updated milestone probability that maximizes an updated product of selected updated milestone probabilities in response to the updated search space graph. In another example, the disclosed system selects an updated milestone probability in response to finding an updated shortest path through the updated search space graph. In yet another example, the disclosed system associates an updated cost function with each edge in the updated search space graph and selects an updated milestone probability in response to finding an updated path through the updated search space graph that minimizes a combination of updated cost functions associated with each edge traversed by the updated path. The disclosed system classifies each indicator in the updated sequence of indicators in response to the selected updated milestone probabilities. In these examples, the updated milestone probability is selected simultaneously for each indicator in the updated sequence of indicators.

In some embodiments, the metrics generated by the disclosed system for each indicator are probabilities associated with a likelihood that the indicator corresponds to a particular milestone. These probabilities are used by the disclosed system to classify or assign each indicator to a milestone that provides a more meaningful description of the physical event than the indicator provides on its own.

For instance, in some applications the indicator is a generic or standard code used to indicate that a particular physical event has happened. In many cases, the same generic or standard code is used to indicate various different types of physical events but fails to capture important details regarding the physical event to the receiver of the code. In such cases, translating, transforming, or classifying the received codes into meaningful milestones provides better visibility and useful information regarding each physical event that has happened, including details that are not provided by the received codes.

In some embodiments, the disclosed system determines an entity associated with the current indicator. In this case, the previously received indicators and the subsequent indicator also correspond to physical events associated with the entity. In some examples as described herein, the entity is a shipping container being tracked along a journey from an origin to a destination. Each indicator in the current sequence of indicators and each indicator in the updated sequence of indicators include a status code conveying a shipping status for the shipping container. In addition, each milestone provides a description of a possible physical event experienced by the shipping container along the journey.

A goal of the disclosed method and system is to classify each indicator received in sequence into a meaningful milestone so that the resulting sequence of milestones accurately represents the series of physical events experienced by the shipping container. This provides better visibility into the container's status at any point in time throughout its journey as each indicator is received. To accomplish this goal, the disclosed system processes the received indicators to generate a set of current milestone probabilities and to generate a set of updated milestone probabilities using machine learning techniques. In some cases, processing the received indicators includes taking a received indicator in the form of raw data, converting and parsing the raw data into a standard or readable format, extracting features from the converted or parsed data, and applying machine learning techniques using the extracted features to generate a set of probabilities associated with a likelihood that the received indicator corresponds to a particular milestone. In particular, each probability in the set of probabilities is associated with a likelihood that the received indicator corresponds to a particular milestone selected from a set or plurality of possible milestones. Embodiments of an exemplary disclosed method and system will now be described with respect to the following figures.

FIG. 1A is a block diagram showing an embodiment of an exemplary system 100 for processing events. FIG. 1B is a flowchart showing steps in an exemplary process 111 performed by the system 100 of FIG. 1A.

As shown in FIGS. 1A and 1B, at 101, a current file comprising a current indicator corresponding to an event is received via a data connection established between FTP server 110 and Shuttle 120. The system 100 is triggered by the receipt of the current file. The current file is pulled from FTP server 110 via the data connection and is received by Shuttle 120.

At 102, Shuttle 120 saves the current file comprising current indicator to Data Store 130. Data Store 130 can be a web service such as a simple storage service that provides storage through web services interfaces or any other storage device or service used to store data files.

At 103, an identifier providing a reference to Data Store 130 to provide access to the current file comprising the indicator is extracted from the current file and passed at 103 from Shuttle 120 to Parser 140. In this example, the identifier is a Uniform Resource Locator (URL) that is passed from Shuttle 120 to Parser 140.

At 104, using the identifier or URL, Parser 140 pulls the current file from Data Store 130 and processes the current file, which is currently in a raw data format, to convert the format of the current file into a standard or readable format. In the example shown, the current file is an EDI file and Parser 140 is an EDI Parser that processes and parses the EDI file to convert it into a JSON object.

FIG. 2A shows an example of an EDI file 200 received in its raw data format while FIG. 2B shows an example of a JSON object 201 resulting from parsing and converting the EDI file of FIG. 2A. Note that Parser 140 can also be used to identify an entity by using or detecting for example, an entity identifier associated with the current file comprising the current indicator.

As shown in FIG. 1A at 105, the standard or readable version of the current file, which in this case is a JSON object 201 shown in FIG. 2B converted from EDI file 200 shown in FIG. 2A, is passed to Data Processor 150. In the example shown, Data Processor 150 accesses previously received and processed files comprising indicators corresponding to previous events through the mechanism described above for receiving a current file but applied to the previously received files.

Previously received and processed files along with data extracted, derived, or associated with the previously received and processed files is stored for example in Database Management System 170 via a connection 109. Database Management System 170 can be a system such as PostgreSQL ("Postgres"), which is an object-relational database management system (ORDBMS), or any other system that can function as a database server to store data securely and return that data in response to requests from other software applications.

At 106, the entity identifier identified or detected by Parser 140 is passed to Sequential Event Analyzer 160.

At 107, using the entity identifier received from Parser 140, Sequential Event Analyzer 160 pulls a history from Data Processor 150. The history received by Sequential Event Analyzer 160 from Data Processor 150 is associated with the entity identified by the entity identifier and can include previously received files associated with the entity, previously processed files associated with the entity, and data extracted, derived, or associated with the previously received or processed files associated with the entity.

Extracting indicators from the history and the processed current file associated with the entity, Sequential Event Analyzer 160 forms a current sequence of indicators and generates current metrics for each indicator in the current sequence of indicators. Sequential Event Analyzer 160 classifies each indicator in the current sequence of indicators in response to the current metrics using a combination of machine learning and graph techniques to generate a classification result for each indicator in the current sequence of indicators.

At 108, Sequential Event Analyzer 160 passes the classification result for each indicator in the current sequence of indicators to Data Processor 150. The classification result for each indicator in the current sequence of indicators can be stored for example in Database Management System 170 which is connected to Data Processor 150 at 109.

In the example shown, the system and method described with respect to FIG. 1A is repeated for any subsequently received files, wherein a subsequent file that triggers the system and is received via the data connection at 101 comprises a subsequent indicator corresponding to a subsequent event happening after the event associated with the current indicator.

Repeating the process for a subsequent file, first the subsequent file is pulled from FTP server 110 via the data connection at 101 and is received by Shuttle 120. At 102, Shuttle 120 saves the subsequent file comprising the subsequent indicator to Data Store 130. At 103, an identifier providing a reference to Data Store 130 to provide access to the subsequent file comprising the indicator is passed at 103 from Shuttle 120 to Parser 140. Here, the identifier is a Uniform Resource Locator (URL) that is passed from Shuttle 120 to Parser 140. At 104, using the identifier or URL, Parser 140 pulls the subsequent file from Data Store 130 and processes the subsequent file, which is currently in a raw data format, to convert the format of the subsequent file into a standard or readable format. In this case, the subsequent file is an EDI file and Parser 140 is an EDI Parser that processes and parses the EDI file to convert it into a JSON object. Parser 140 can also be used to identify an entity by using or detecting for example, an entity identifier associated with the subsequent file comprising the subsequent indicator. At 105, the standard or readable version of the subsequent file, which in this case is a JSON object converted from an EDI file, is passed to Data Processor 150. Data Processor 150 accesses previously received and processed files comprising indicators corresponding to previous events, which would now include the current file comprising the current indicator as described herein.

At 109, previously received and processed files (which now include the previously received and processed current file and current indicator) along with data extracted, derived, or associated with the previously received and processed files, is stored in Database Management System 170. At 106, the entity identifier identified or detected by Parser 140 is passed to Sequential Event Analyzer 160. At 107, using the entity identifier received from Parser 140, Sequential Event Analyzer 160 pulls a history from Data Processor 150. The history received by Sequential Event Analyzer 160 from Data Processor 150 is associated with the entity identified by the entity identifier. The history can include previously received files associated with the entity, previously processed files associated with the entity, and data extracted, derived, or associated with the previously received or processed files associated with the entity. At this point, the previously received or processed files include the previously received and processed current file.

Extracting indicators from the history and the processed subsequent file associated with the entity, Sequential Event Analyzer 160 forms a subsequent sequence of indicators and generates subsequent metrics for each indicator in the subsequent sequence of indicators. Sequential Event Analyzer 160 classifies each indicator in the subsequent sequence of indicators in response to the subsequent metrics using a combination of machine learning and graph techniques to generate a classification result for each indicator in the subsequent sequence of indicators.

At 108, Sequential Event Analyzer 160 passes the classification result for each indicator in the subsequent sequence of indicators to Data Processor 150. Here, the classification result for each indicator in the subsequent sequence of indicators is stored in Database Management System 170 which is connected to Data Processor 150 at 109.

Note that because the system regenerates metrics and reclassifies each indicator in the entire history of indicators every time it receives a new file comprising a new and presumably a most recent indicator, the system is able to use any new information gleaned from the new file to inform its classification decisions and optimize its prediction over the entire history of events. Unlike a classification system that relies only on a set of custom hard-coded rules to map indicators to meaningful milestones, the system described herein adjusts its decision making process by re-evaluating its decisions every time it receives a new data point corresponding to an event. This adjustment is automatic and performed essentially in real time as new files are received and processed by the system.

FIG. 3A shows a flowchart depicting an exemplary method 300 for processing events that can be performed by the system 100 of FIG. 1A, as triggered by receiving a current indicator corresponding to a current event.

As shown in FIG. 3A, the system 100 receives a current indicator corresponding to a current event at 310 and appends the current indicator to a sequence of indicators to form a current sequence of indicators at 320. In the example shown, the sequence of indicators includes a series of previously received indicators sequentially ordered in a received order. For example, a sequence of indicators can be formed starting with a first received indicator as a first entry in a series and adding each subsequently received indicator to the end of the series, resulting in a series or sequence of indicators in a sequential order. The sequence of indicators corresponds to a series of sequential events and appending the current indicator to the sequence forms a current sequence of indicators. The previously received indicators can be pulled from a history of indicators stored in a database such as Database Management System 170 through Data Processor 150 as shown in FIG. 1A.

At 330, the system 100 generates current metrics for each indicator in the current sequence of indicators and classifies each indicator in the current sequence of indicators in response to the current metrics at 340. Here, the classification of indicators is performed by referencing a milestone graph and by using a combination of machine learning and graph techniques as will be described in more detail below. In the example shown, the milestone graph is configured to define a valid ordered sequence of transitions to milestones and constraints associated with each transition from one milestone in the ordered sequence to another milestone in the ordered sequence.

FIG. 3B shows a flowchart depicting an exemplary method 301 for processing events that can be performed by the system 100 of FIG. 1A, as triggered by receiving a subsequent indicator corresponding to a subsequent event.

As shown in FIG. 3B, the system 100 receives a subsequent indicator corresponding to a subsequent event at 350, and appends the subsequent indicator to the current sequence of indicators as described above with respect to FIG. 3A to form an updated sequence of indicators at 360. In the example shown, previously received indicators included in the current sequence of indicators can be pulled from a history of indicators stored in a database such as Database Management System 170 through Data Processor 150 as shown in FIG. 1A.

At 370, the system 100 generates updated metrics for each indicator in the updated sequence of indicators and classifies each indicator in the updated sequence of indicators in response to the updated metrics at 380. Here, as in the case described above with respect to the current sequence of indicators, the classification of indicators is performed by referencing a milestone graph and by using a combination of machine learning and graph techniques as will be described in more detail below. In the example shown, the milestone graph is configured to define a valid ordered sequence of transitions to milestones and constraints associated with each transition from one milestone in the ordered sequence to another milestone in the ordered sequence.

FIG. 4A shows a flowchart depicting another exemplary method 400 for processing events performed by the system 100 of FIG. 1A, as triggered by receiving a current indicator corresponding to a current event. In the example shown, machine learning techniques using features extracted from each indicator are applied to generate milestone probabilities.

As shown in FIG. 4A, the system 100 receives a current indicator corresponding to a current event at 410 and appends the current indicator to a sequence of indicators to form a current sequence of indicators at 420. The sequence of indicators includes a series of previously received indicators sequentially ordered in a received order. The sequence of indicators corresponds to a series of sequential events and appending the current indicator to the sequence forms a current sequence of indicators. The previously received indicators can be pulled from a history of indicators stored in a database such as Database Management System 170 through Data Processor 150 as shown in FIG. 1A.

At 430, the system 100 generates current milestone probabilities including a probability of rejection for each indicator in the current sequence of indicators, for example, by applying machine learning techniques to features extracted from each indicator. At 431, the system 100 associates each of the current milestone probabilities that is not a probability of rejection with a transition to a milestone. Finally, at 440, the system 100 classifies each indicator in the current sequence of indicators in response to the current milestone probabilities.

FIG. 4B shows a flowchart depicting another exemplary method 401 for processing events performed by the system 100 of FIG. 1A, as triggered by receiving a subsequent indicator corresponding to a subsequent event. As in the case described with respect to FIG. 4A, machine learning techniques are applied in this case to features extracted from each indicator to generate milestone probabilities.

As shown in FIG. 4B, the system 100 receives a subsequent indicator corresponding to a subsequent event at 450 and appends the subsequent indicator to the current sequence of indicators as described above with respect to FIG. 4A to form an updated sequence of indicators at 460. In the example shown, previously received indicators included in the current sequence of indicators can be pulled from a history of indicators stored in a database such as Database Management System 170 through Data Processor 150 as shown in FIG. 1A.

At 470, the system 100 generates updated milestone probabilities including a probability of rejection for each indicator in the updated sequence of indicators, for example, by applying machine learning techniques to features extracted from each indicator. At 471, the system 100 associates each of the updated milestone probabilities that is not a probability of rejection with a transition to a milestone. Finally, at 480, the system 100 classifies each indicator in the updated sequence of indicators in response to the updated milestone probabilities.

Note that the metrics generated by the system for each indicator as described above are milestone probabilities associated with a likelihood that the indicator corresponds to a particular milestone. These milestone probabilities are used by the system to classify or assign each indicator to a milestone that provides a more meaningful description of the event than the indicator provides on its own.

In order to assign or classify each indicator to a milestone, one of the probabilities in the set of milestone probabilities is selected simultaneously for each indicator in the sequence as will be described in more detail herein. However, rather than simply choosing the milestone having the highest probability for each indicator, the probabilities for each indicator (and hence the classification of each indicator) are chosen so as to maximize the joint probability across all of the indicators in the sequence of indicators subject to certain constraints. The constraints are provided in the form of a milestone graph referenced by the system and configured to embody a sequential order of events that is possible or allowable in the real world. In this manner, the milestone graph provides a structure that, among other things, can be used to enforce rules defining the sequential order for a series of events to occur that comports with real world constraints.

In addition to the constraints and rules described above, soft transition probabilities can also be defined and applied. Soft transitions are used for situations that are very rare or much less likely to happen and thus, do not warrant the application of hard constraints. For example, in the case of a shipping container, although very rare and unlikely, it is possible that a container could be partially emptied at some interim point in its journey. Thus, applying a hard constraint (e.g., defining a rule that strictly prohibits a transition to an empty container state in an interim point in the journey that corresponds to certain milestones) may not make sense in these situations of rare occurrence. Instead, a soft constraint (e.g., defining a rule that allows the transition with a low probability) may make more sense.

Figure 5A:
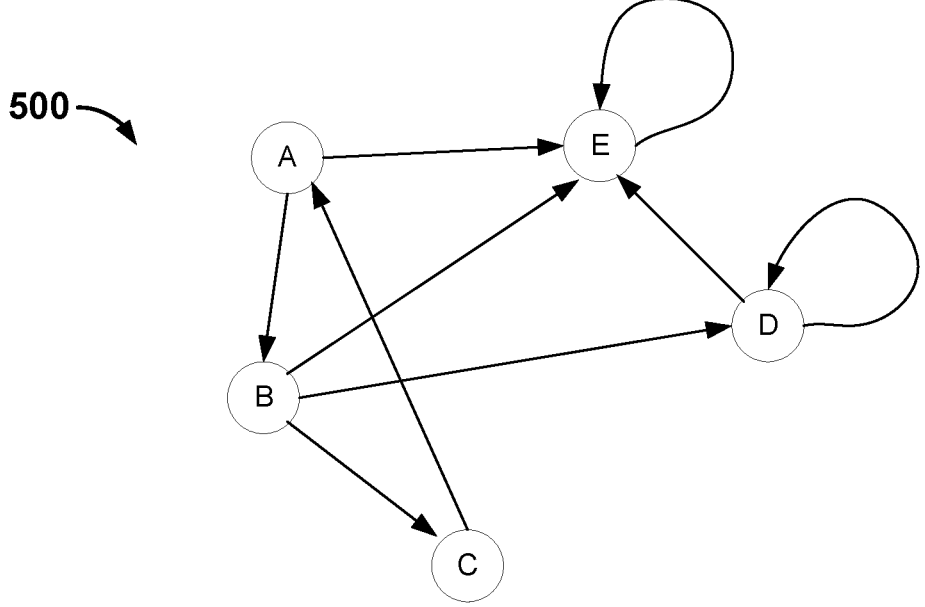
FIG. 5A depicts an exemplary embodiment of a milestone graph comprising sequences of nodes connected by edges.

FIG. 5A depicts an exemplary embodiment of a milestone graph 500 comprising sequences of nodes connected by edges. Each node in the set of nodes (labeled as A, B, C, D, and E respectively) represents a milestone and each edge (shown as an arrow connecting two nodes in FIG. 5A) defines a transition from one milestone to another milestone. Each edge has an associated probability of transitioning between milestones and one or more constraints (e.g., rules) can be applied to an edge defining a constraint on a transition from a given milestone to a subsequent milestone. These constraints serve to constrain the transition from the given milestone to the subsequent milestone. Accordingly, the milestone graph 500 defines a valid ordered sequence of transitions to milestones and constraints associated with each transition from one milestone in the ordered sequence to another milestone in the ordered sequence. Here, a valid ordered sequence of transitions corresponds to a classification of a sequential order of events that is physically possible in the real world. The sequential order of events is defined by the current or updated sequence of indicators depending on the sequence that is being processed and the indicators that are being classified.

Note that there can be many valid ordered sequences of transitions to milestones. The milestone graph 500 is configured to include a plurality of valid ordered sequences of transitions to milestones, each of which can be embodied by a path through the milestone graph 500. The path is created by transitioning from one milestone to another milestone by traversing edges between milestones.

The set of current milestone probabilities generated as described herein can be mapped to edges in the graph to provide associated probabilities of transitioning between milestones in the path, each milestone along the path corresponding to a possible classification of each indicator in the current sequence of indicators. Similarly, the set of updated milestone probabilities generated after receiving and processing a subsequent indicator as described herein can be mapped to edges in the graph to provide associated probabilities of transitioning between milestones in the path, each milestone along the path corresponding to a possible classification of each indicator in the subsequent sequence of indicators.

Machine learning techniques used to generate milestone probabilities for each indicator are combined with graph techniques. Here, the graphs embody physical constraints governing what can actually happen in the real world. This provides an ability to classify a series of events represented or received initially as a sequence of generic codes into a sequence of meaningful milestones that impart improved visibility and useful information pertaining to each event and the order in which the events occurred relative to one another. However, the problem of mapping a sequence of generic codes into a sequence of meaningful milestones is made more difficult due to incomplete or missing data. For example, data corresponding to an event in the sequence may be received out of order or may be missing entirely due to not having been generated, transmitted, or received. In some cases, an indicator is not received for an event that actually occurred. Consequently, to address the problem of incomplete or missing data, a transition is defined as valid if there is a valid path between two milestones, even if the path is not a direct edge between the two milestones. In the example shown in FIG. 5A, A to E is a valid transition via several different paths such as, for example, A→E, A→B→E, A→B→D→E, and A→B→C→A→E.

An approach to classifying and transforming sequential event data using milestone probabilities and by referencing a graph such as the milestone graph 500 of FIG. 5A will now be described with respect to the following figures.

FIG. 6A shows a flowchart depicting an exemplary method 600 that references a milestone graph and generates a current search space graph for classifying events. The method 600 is triggered by receiving a current indicator corresponding to a current event.

The method 600 includes receiving a current indicator corresponding to a current event at 610 and appending the current indicator to a sequence of indicators to form a current sequence of indicators at 620. The sequence of indicators includes a series of previously received indicators sequentially ordered in a received order. The sequence of indicators corresponds to a series of sequential events and appending the current indicator to the sequence of indicators forms a current sequence of indicators. The previously received indicators that form the original sequence of indicators can be pulled from a history of indicators stored in a database such as Database Management System 170 through Data Processor 150 as shown in FIG. 1A.

In the example shown, the method 600 includes detecting and removing duplications of indicators from the current sequence of indicators at 625. Here, removing duplications of indicators serves to reduce a computational complexity and to improve an efficiency associated with determining an optimal classification solution. In some embodiments, duplicate instances or duplications of each indicator are detected and removed from the current sequence of indicators by Data Processor 150.

At 630, the method 600 includes generating current milestone probabilities including a probability of rejection for each indicator in the current sequence of indicators, for example, by using machine learning techniques. At 631, each of the current milestone probabilities that is not a probability of rejection is associated with a transition to a milestone.

At 632, the method 600 includes referencing a milestone graph defining a valid ordered sequence of transitions to milestones and associated constraints. In some embodiments, the milestone graph includes sequences of nodes connected by edges, wherein each node represents a milestone, and wherein each edge defines a transition from one milestone to another milestone. Each edge in the milestone graph has an associated probability of transitioning between milestones. Additionally, one or more constraints applied to an edge defining a transition from a given milestone to a subsequent milestone constrain the transition from the given milestone to the subsequent milestone.

As described above with respect to the exemplary milestone graph 500 of FIG. 5A, a path is created by transitioning from one milestone to another milestone by traversing edges between milestones. Here, the milestone graph serves to codify logic about how one milestone can transition to another milestone. This logic can be derived from industry knowledge and information about real world constraints regarding a valid order of sequencing events that correspond to the milestones.

In some embodiments, an optimization step is performed by finding a maximum likelihood assignment or selection of current milestone probabilities that define a path through the milestone graph and do not violate any of the constraints laid out in the milestone graph. This optimization step includes generating a current search space graph in response to the referenced milestone graph and the current sequence of indicators and using a shortest path algorithm to find a maximum likelihood path through the current search space graph. The length of the path can be defined as the sum of the negative logarithm of individual probabilities of the milestone at each node. The optimization step serves to reduce a computational complexity and to improve an efficiency associated with determining an optimal classification solution.

As an example, returning to the milestone graph 500 of FIG. 5A, suppose there are four input signals [x1, x2, x3, x4] with each input signal corresponding for example to an indicator in a sequence of four indicators, and five possible milestones (e.g., the set of nodes labeled as A, B, C, D, and E respectively in FIG. 5A). In this case, generating a complete, fully combinatorial, search space graph (i.e., a search space graph based on all possible combinations of probability assignments to milestones generated without referencing the constraints of the milestone graph) would start with five possible milestone mappings [A, B, C, D, E] where each of these mappings could potentially transition to each of the five possible milestones, and so on, until the end of the sequence of indicators is reached. Here, each of the four input signals has a set of five possible milestone probabilities. Taking all possible combinations, this results in a product of 5×5×5×5=625 possible assignments of milestones, and so there are 625 nodes in the complete search space graph.

Figure 5B:
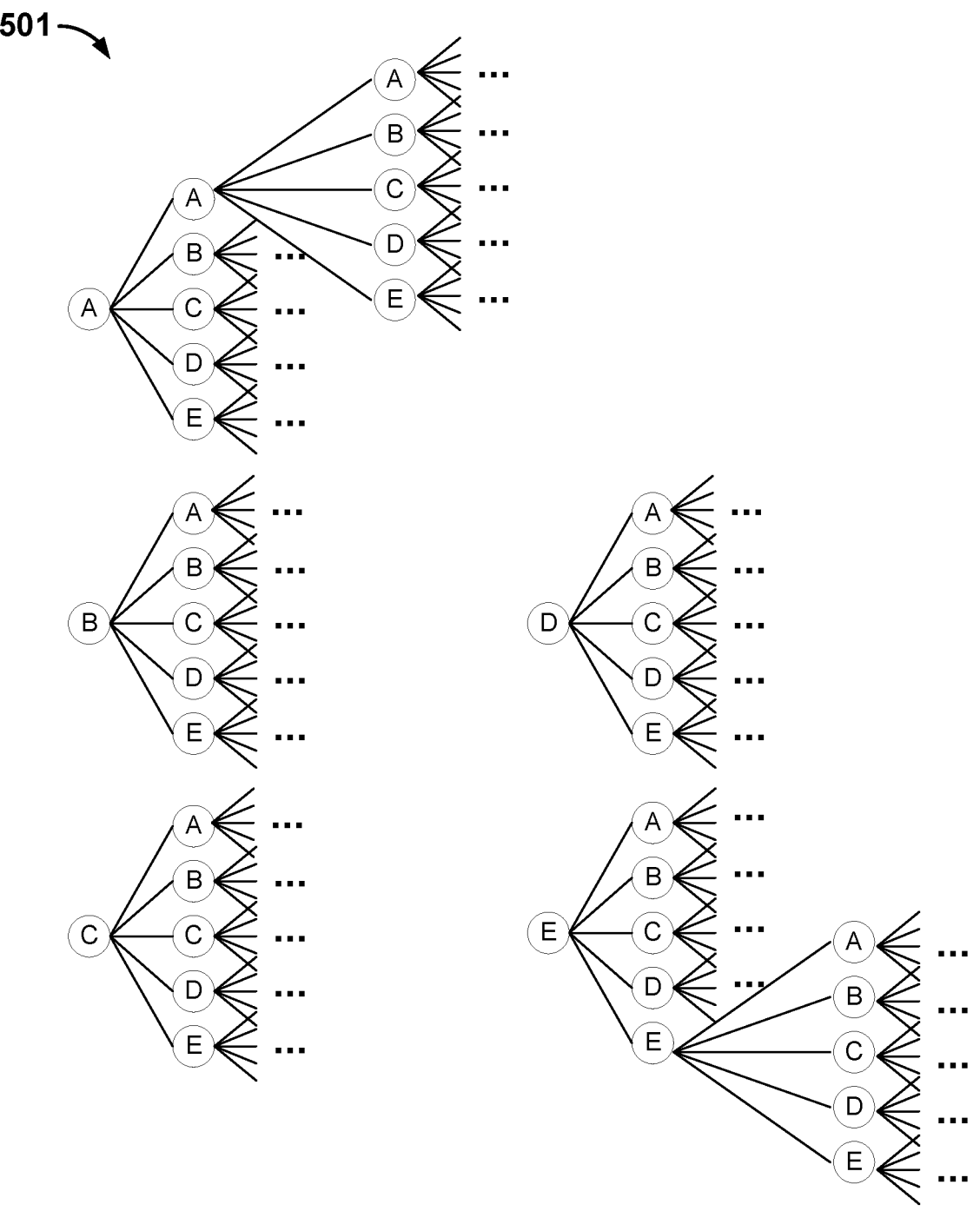
FIG. 5B shows an example of a complete, fully combinatorial, search space graph.

FIG. 5B shows an example of a complete, fully combinatorial, search space graph 501. As described above, the complete, fully combinatorial, search space graph 501 is based on all possible combinations of probability assignments to milestones without referencing the constraints of milestone graph 500. Note however, that there are two problems with using the complete, fully combinatorial, search space graph 501 to find an optimal solution. First, the complete search space graph would get big very quickly, resulting in a possibly intractable problem due to the large computational complexity associated with finding the optimal solution. Second, this complete search space graph does not account for any of the physical and logical limitations on transitions as captured by milestone graph 500 that are known to be true.

In order to reduce the computational complexity, improve efficiency, and to make the problem tractable in order to find an optimal solution, milestone graph 500 is referenced to cull the complete search space graph 501 down to a more manageable size and to ensure that no paths are traversed that are known, a priori, to be erroneous. For example, if it is known that A can never transition to C as shown in milestone graph 500, every path in the complete search space graph 501 that has an edge between A and C can be removed by referencing the milestone graph to form a culled search space graph.

Figure 5C:
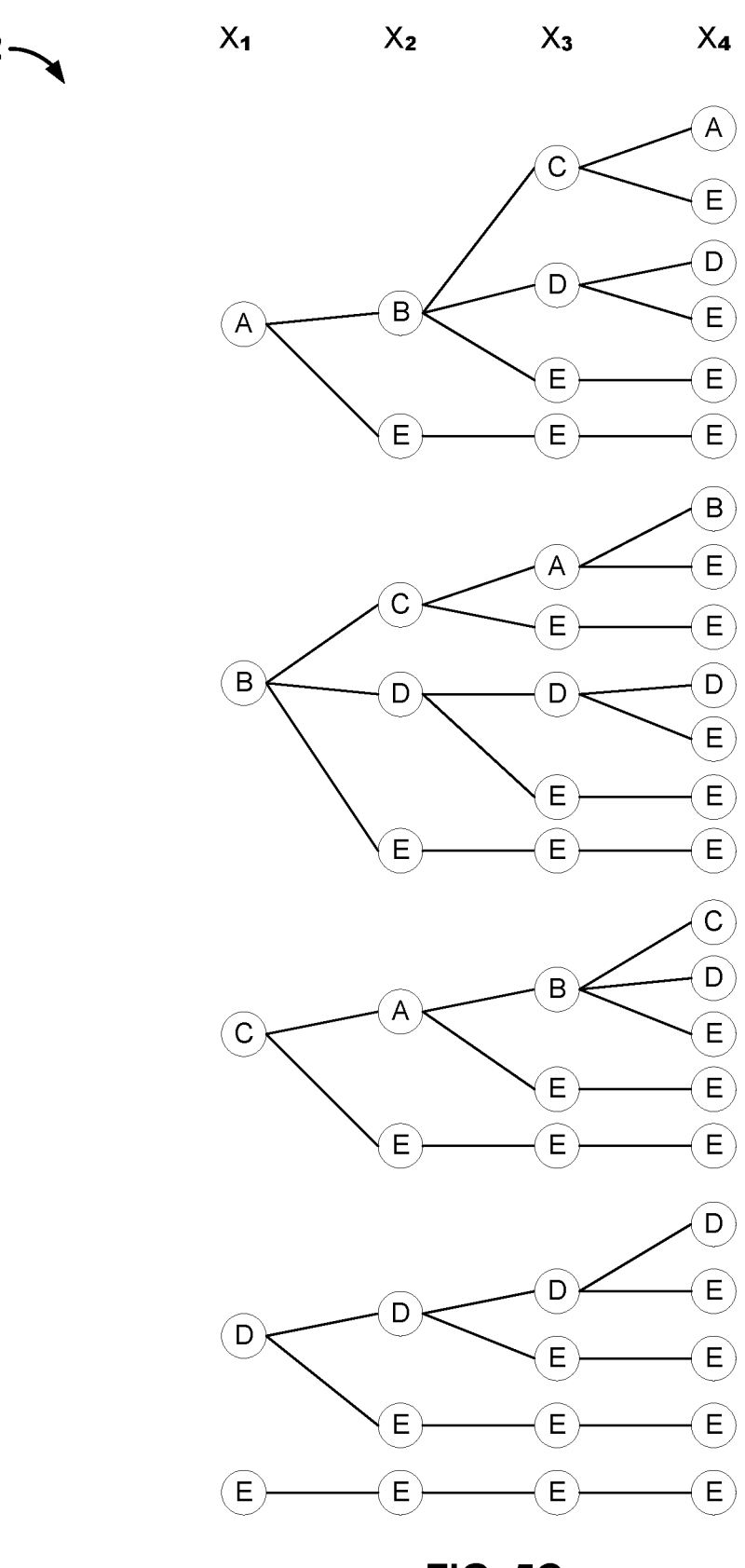
FIG. 5C shows an example of a culled search-space graph generated by referencing the milestone graph of FIG. 5A.

FIG. 5C shows an example of a culled search-space graph 502 generated by referencing the milestone graph 500 of FIG. 5A. As shown in the example of FIG. 5C, the culled search space graph 502 represents a combination of the milestone graph 500 and the complete search-space graph 501. Each input signal in the set of four input signals [x1, x2, x3, x4] corresponding to a sequence of four indicators is depicted above the possible milestone assignments represented by the sequences of nodes in the culled search space graph 502. Once the culled search space graph 502 has been generated, a shortest path algorithm can be used to find a maximum likelihood path through the culled search space graph 502. Here, the length of the path is defined as the sum of the negative logarithm of individual probabilities of the milestone at each node, wherein the shortest path corresponds to the smallest sum.

Returning now to FIG. 6, at step 633, a current search space graph is generated in response to the referenced milestone graph and the current sequence of indicators. In the example shown, the current search space graph is a culled version of a complete, fully combinatorial, search space graph, wherein the culled version is generated by applying constraints captured by or represented in the referenced milestone graph. The current search space graph can be formed as a subset of a complete search space graph by determining which milestones and transitions to milestones are satisfied by a set of given constraints corresponding for example, to rules that apply to real world applications in response to the current sequence of indicators. In this manner, the current search space graph serves to reduce a computational complexity and to improve an efficiency associated with determining an optimal classification solution.

In this example, at 634, a current milestone probability is selected simultaneously for each indicator in the current sequence of indicators that maximizes a current product of selected current milestone probabilities in response to the current search space graph across all indicators in the current sequence of indicators. In particular, maximizing a current product can include taking a current product of selected current milestone probabilities across all indicators in the current sequence of indicators in response to the current search space graph. Here, the current milestone probability for each indicator in the current sequence of indicators is selected in response to satisfying constraints on transitions to selected current milestones associated with each of the selected current milestone probabilities so as to form a valid path as defined by the current search space graph.

Finally, at 640, each indicator in the current sequence of indicators is classified in response to the current milestone probabilities by referencing the current search space graph.

FIG. 6B shows a flowchart depicting an exemplary method 601 that references a milestone graph and generates an updated search space graph for classifying events as triggered by receiving a subsequent indicator corresponding to a subsequent event.

As shown in FIG. 6B, the method 601 includes receiving a subsequent indicator corresponding to a subsequent event at 650 and appending the subsequent indicator to the current sequence of indicators as described above with respect to FIG. 6A to form an updated sequence of indicators at 660. Previously received indicators included in the current sequence of indicators can be pulled from a history of indicators stored in a database such as Database Management System 170 through Data Processor 150 as shown in FIG. 1A.

The method 601 also includes detecting and removing duplications of indicators from the updated sequence of indicators at 665. As described above, removing duplications of indicators serves to reduce a computational complexity and to improve an efficiency associated with determining an optimal classification solution. In some embodiments, duplicate instances or duplications of each indicator are detected and removed from the updated sequence of indicators by Data Processor 150.

At 670, the method 601 includes generating updated milestone probabilities including a probability of rejection for each indicator in the updated sequence of indicators, for example, by using machine learning techniques. At 671, each of the updated milestone probabilities that is not a probability of rejection is associated with a transition to a milestone.

At 672, the method 601 includes referencing a milestone graph defining a valid ordered sequence of transitions to milestones and associated constraints. In some embodiments, the milestone graph includes sequences of nodes connected by edges, wherein each node represents a milestone, and wherein each edge defines a transition from one milestone to another milestone. Each edge in the milestone graph has an associated probability of transitioning between milestones. Additionally, one or more constraints applied to an edge defining a transition from a given milestone to a subsequent milestone constrain the transition from the given milestone to the subsequent milestone.

At 673, an updated search space graph is generated in response to the referenced milestone graph and the updated sequence of indicators. In the example shown, the updated search space graph is a culled version of a complete search space graph, wherein the updated search space graph is generated by applying constraints captured by or represented in the referenced milestone graph. The updated search space graph can be formed as a subset of the complete search space graph by determining which milestones and transitions to milestones are satisfied by a set of given constraints corresponding for example, to rules that apply to real world applications in response to the updated sequence of indicators. In this manner, the updated search space graph serves to reduce a computational complexity and to improve an efficiency associated with determining an optimal classification solution.

In this example, at 674, an updated milestone probability is selected simultaneously for each indicator in an updated sequence of indicators that maximizes an updated product of selected updated milestone probabilities in response to the updated search space graph across all indicators in the updated sequence of indicators. In particular, maximizing an updated product can include taking an updated product of selected updated milestone probabilities across all indicators in the updated sequence of indicators in response to the updated search space graph. Here, the updated milestone probability for each indicator in the updated sequence of indicators is selected in response to satisfying constraints on transitions to selected updated milestones associated with each of the selected updated milestone probabilities so as to form a valid path as defined by the updated search space graph.

Finally, at 680, each indicator in the updated sequence of indicators is classified in response to the updated milestone probabilities by referencing the updated search space graph.

FIG. 7A shows a flowchart depicting an exemplary method 700 that includes finding a shortest path through a current search space graph to select current milestone probabilities for classifying events as triggered by receiving a current indicator corresponding to a current event.

As shown in FIG. 7A, the method 700 includes receiving a current indicator corresponding to a current event at 710 and appending the current indicator to a sequence of indicators to form a current sequence of indicators at 720. The sequence of indicators includes a series of previously received indicators sequentially ordered in a received order. The sequence of indicators corresponds to a series of sequential events and appending the current indicator to the sequence of indicators forms a current sequence of indicators. The previously received indicators that form the original sequence of indicators can be pulled from a history of indicators stored in a database such as Database Management System 170 through Data Processor 150 as shown in FIG. 1A.

In the example shown, the method 700 includes detecting and removing duplications of indicators from the current sequence of indicators at 725. As described previously, removing duplications of indicators serves to reduce a computational complexity and to improve an efficiency associated with determining an optimal classification solution. In some embodiments, duplicate instances or duplications of each indicator are detected and removed from the current sequence of indicators by Data Processor 150. At 730, the method 700 includes generating current milestone probabilities including a probability of rejection for each indicator in the current sequence of indicators, for example, by using machine learning techniques. At 731, each of the current milestone probabilities that is not a probability of rejection is associated with a transition to a milestone.

At 732, the method 700 includes referencing a milestone graph defining a valid ordered sequence of transitions to milestones and associated constraints. In some embodiments, the milestone graph includes sequences of nodes connected by edges, wherein each node represents a milestone, and wherein each edge defines a transition from one milestone to another milestone. Each edge in the milestone graph has an associated probability of transitioning between milestones. Additionally, one or more constraints applied to an edge defining a transition from a given milestone to a subsequent milestone constrain the transition from the given milestone to the subsequent milestone.

At 733, a current search space graph is generated in response to the referenced milestone graph and the current sequence of indicators. In the example shown, the current search space graph is a culled version of a complete search space graph, wherein the current search space graph is generated by applying constraints captured by or represented in the referenced milestone graph. The current search space graph can be formed as a subset of a complete search space graph by determining which milestones and transitions to milestones are satisfied by a set of given constraints corresponding for example, to rules that apply to real world applications in response to the current sequence of indicators. In this manner, the current search space graph serves to reduce a computational complexity and to improve an efficiency associated with determining an optimal classification solution.

A path is created by transitioning from one milestone to another milestone by traversing edges between milestones. A valid path may be taken through a graph provided that none of the constraints associated with the edges between milestones traversed by the path are violated. A current shortest path through the current search space graph will be a valid path wherein none of the constraints associated with transitions between milestones as determined by the current sequence of indicators are violated. Accordingly, a current milestone probability for each indicator in the current sequence of indicators can be selected simultaneously for each indicator in response to satisfying constraints on transitions to selected current milestones associated with each of the selected current milestone probabilities so as to form a valid path as defined by the current search space graph.

In this example, at 735, a current milestone probability is selected simultaneously for each indicator in response to finding a current shortest path through the current search space graph. The current shortest path includes transitioning from one milestone to another milestone along edges between milestones in the current search space graph, wherein the associated probabilities of transitioning between milestones in the current shortest path are selected in response to the set of current milestone probabilities for each indicator in the current sequence of indicators. As an example, the current shortest path can be found using a shortest path algorithm including a uniform cost search algorithm, Dijkstra's algorithm, or any other shortest path algorithm as known in the art or yet to be developed.

Finally, at 740, each indicator in the current sequence of indicators is classified in response to the selected current milestone probabilities, wherein the current milestone probabilities are selected as described above by referencing the current search space graph.

FIG. 7B shows a flowchart depicting an exemplary method 701 that includes finding a shortest path through an updated search space graph to select updated milestone probabilities for classifying events as triggered by receiving a subsequent indicator corresponding to a subsequent event.

As shown in FIG. 7B, the method 701 includes receiving a subsequent indicator corresponding to a subsequent event at 750 and appending the subsequent indicator to the current sequence of indicators as described above with respect to FIG. 7A to form an updated sequence of indicators at 760. Previously received indicators included in the current sequence of indicators can be pulled from a history of indicators stored in a database such as Database Management System 170 through Data Processor 150 as shown in FIG. 1A.

The method 701 also includes detecting and removing duplications of indicators from the updated sequence of indicators at 765. Removing duplications of indicators serves to reduce a computational complexity and to improve an efficiency associated with determining an optimal classification solution. In some embodiments, duplicate instances or duplications of each indicator are detected and removed from the updated sequence of indicators by Data Processor 150.

At 770, the method 701 includes generating updated milestone probabilities including a probability of rejection for each indicator in the updated sequence of indicators, for example, by using machine learning techniques. At 771, each of the updated milestone probabilities that is not a probability of rejection is associated with a transition to a milestone.

At 772, the method 701 includes referencing a milestone graph defining a valid ordered sequence of transitions to milestones and associated constraints. In some embodiments, the milestone graph includes sequences of nodes connected by edges, wherein each node represents a milestone, and wherein each edge defines a transition from one milestone to another milestone. Each edge in the milestone graph has an associated probability of transitioning between milestones. Additionally, one or more constraints applied to an edge defining a transition from a given milestone to a subsequent milestone constrain the transition from the given milestone to the subsequent milestone.

At 773, an updated search space graph is generated in response to the referenced milestone graph and the updated sequence of indicators. In the example shown, the updated search space graph includes a set of updated valid paths through a set of updated milestones. In particular, the updated valid paths are defined by a set of satisfied constraints. The updated search space graph can be formed as a subset of a complete search space graph by referencing a milestone graph to determine the milestones and transitions to milestones that are satisfied by a set of given constraints corresponding for example, to rules that apply to real world applications in response to the updated sequence of indicators. In this manner, the updated search space graph serves to reduce a computational complexity and to improve an efficiency associated with determining an optimal classification solution.

In the example of FIG. 7B, an updated milestone probability is selected simultaneously for each indicator in response to finding an updated shortest path through the updated search space graph at 775. In particular, a path is created by transitioning from one milestone to another milestone by traversing edges between milestones and a valid path may be taken through a graph provided that none of the constraints associated with the edges between milestones traversed by the path are violated. Accordingly, in the example shown, an updated milestone probability is selected simultaneously for each indicator in the updated sequence of indicators in response to satisfying constraints on transitions to selected updated milestones associated with each of the selected updated milestone probabilities so as to form a valid path as defined by the updated search space graph.

The updated shortest path includes transitioning from one milestone to another milestone along edges between milestones in the updated search space graph, wherein the associated probabilities of transitioning between milestones in the updated shortest path are selected in response to the set of updated milestone probabilities for each indicator in the updated sequence of indicators. As an example, the updated shortest path can be found using a shortest path algorithm including a uniform cost search algorithm, Dijkstra's algorithm, or any other shortest path algorithm as known in the art or yet to be developed.

Finally, at 780, each indicator in the updated sequence of indicators is classified in response to the updated milestone probabilities by referencing the updated search space graph.

FIG. 8A shows a flowchart depicting an exemplary method 800 that includes using cost functions applied to a current search space graph to select current milestone probabilities for classifying events as triggered by receiving a current indicator corresponding to a current event.

As shown in FIG. 8A, the method 800 includes receiving a current indicator corresponding to a current event at 810 and appending the current indicator to a sequence of indicators to form a current sequence of indicators at 820. The sequence of indicators includes a series of previously received indicators sequentially ordered in a received order. The sequence of indicators corresponds to a series of sequential events and appending the current indicator to the sequence forms a current sequence of indicators. The previously received indicators can be pulled from a history of indicators stored in a database such as Database Management System 170 through Data Processor 150 as shown in FIG. 1A.

In the example shown, the method 800 includes detecting and removing duplications of indicators from the current sequence of indicators at 825. As described previously, removing duplications of indicators serves to reduce a computational complexity and to improve an efficiency associated with determining an optimal classification solution. In some embodiments, duplicate instances or duplications of each indicator are detected and removed from the current sequence of indicators by Data Processor 150.

At 830, the method 800 includes generating current milestone probabilities including a probability of rejection for each indicator in the current sequence of indicators, for example, by applying machine learning techniques to features extracted from the current sequence of indicators. At 831, each of the current milestone probabilities that is not a probability of rejection is associated with a transition to a milestone.

At 832, the method 800 includes referencing a milestone graph defining a valid ordered sequence of transitions to milestones and associated constraints. In some embodiments, the milestone graph includes sequences of nodes connected by edges, wherein each node represents a milestone, and wherein each edge defines a transition from one milestone to another milestone. Each edge in the milestone graph has an associated probability of transitioning between milestones. Additionally, one or more constraints applied to an edge defining a transition from a given milestone to a subsequent milestone constrain the transition from the given milestone to the subsequent milestone.

At 833, a current search space graph is generated in response to the referenced milestone graph and the current sequence of indicators. In the example shown, the current search space graph is a culled version of a complete search space graph, wherein the current search space graph is generated by applying constraints captured by or represented in the referenced milestone graph. The current search space graph can be formed as a subset of a complete search space graph by determining which milestones and transitions to milestones are satisfied by a set of given constraints corresponding for example, to rules that apply to real world applications in response to the current sequence of indicators. In this manner, the current search space graph serves to reduce a computational complexity and to improve an efficiency associated with determining an optimal classification solution.

As described previously, a path is created by transitioning from one milestone to another milestone by traversing edges between milestones. A valid path may be taken through a graph provided that none of the constraints associated with the edges between milestones traversed by the path are violated. A current shortest path through the current search space graph will be a valid path wherein none of the constraints associated with transitions between milestones as determined by the current sequence of indicators are violated. Accordingly, a current milestone probability for each indicator in the current sequence of indicators can be selected simultaneously for each indicator in response to satisfying constraints on transitions to selected current milestones associated with each of the selected current milestone probabilities so as to form a valid path as defined by the current search space graph.

Here, at 836, the method 800 includes associating a current cost function with each edge in the current search space graph. At 837, a current milestone probability is selected from the set of current milestone probabilities for each indicator in the current sequence of indicators in response to finding a current path through the current search space graph that minimizes a combination of current cost functions associated with each edge traversed by the current path. The current path is formed by transitioning from one milestone to another milestone by traversing edges between milestones in the current search space graph. In this case, the associated probabilities of transitioning between milestones in the current path are selected in response to the set of current milestone probabilities for each indicator in the current sequence of indicators.

In some examples, the current cost function associated with each edge in the current search space graph traversed by the current path is a negative logarithm of the current milestone probability associated with the transition to the particular milestone defined by each edge in the current search space graph traversed by the current path. The method and system described herein is not limited to this particular cost function, and other cost functions may be used as known in the art or yet to be developed.

Finally, at 840, each indicator in the current sequence of indicators is classified in response to the selected current milestone probabilities, wherein the current milestone probabilities are selected as described above by using cost functions applied to the current search space graph.

FIG. 8B shows a flowchart depicting an exemplary method 801 that includes using cost functions applied to an updated search space graph to select updated milestone probabilities for classifying events as triggered by receiving a subsequent indicator corresponding to a subsequent event.

As shown in FIG. 8B, the method 801 includes receiving a subsequent indicator corresponding to a subsequent event at 850 and appending the subsequent indicator to the current sequence of indicators as described above with respect to FIG. 8A to form an updated sequence of indicators at 860. Previously received indicators included in the current sequence of indicators can be pulled from a history of indicators stored in a database such as Database Management System 170 through Data Processor 150 as shown in FIG. 1A.

The method 801 also includes detecting and removing duplications of indicators from the updated sequence of indicators at 865. Removing duplications of indicators serves to reduce a computational complexity and to improve an efficiency associated with determining an optimal classification solution. In some embodiments, duplicate instances or duplications of each indicator are detected and removed from the updated sequence of indicators by Data Processor 150.

At 870, the method 801 includes generating updated milestone probabilities including a probability of rejection for each indicator in the updated sequence of indicators, for example, by applying machine learning techniques to features extracted from the updated sequence of indicators. At 871, each of the updated milestone probabilities that is not a probability of rejection is associated with a transition to a milestone.

At 872, the method 801 includes referencing a milestone graph defining a valid ordered sequence of transitions to milestones and associated constraints. In some embodiments, the milestone graph includes sequences of nodes connected by edges, wherein each node represents a milestone, and wherein each edge defines a transition from one milestone to another milestone. Each edge in the milestone graph has an associated probability of transitioning between milestones. Additionally, one or more constraints applied to an edge defining a transition from a given milestone to a subsequent milestone constrain the transition from the given milestone to the subsequent milestone.

At 873, an updated search space graph is generated in response to the referenced milestone graph and the updated sequence of indicators. In the example shown, the updated search space graph includes a set of updated valid paths through a set of updated milestones. In particular, the updated valid paths are defined by a set of satisfied constraints. The updated search space graph can be formed as a subset of a complete search space graph by referencing a milestone graph to determine the milestones and transitions to milestones that are satisfied by a set of given constraints corresponding for example, to rules that apply to real world applications in response to the updated sequence of indicators. In this manner, the updated search space graph serves to reduce a computational complexity and to improve an efficiency associated with determining an optimal classification solution.

As described previously, a path is created by transitioning from one milestone to another milestone by traversing edges between milestones. A valid path may be taken through a graph provided that none of the constraints associated with the edges between milestones traversed by the path are violated. An updated shortest path through the updated search space graph will be a valid path wherein none of the constraints associated with transitions between milestones as determined by the updated sequence of indicators are violated. Accordingly, an updated milestone probability for each indicator in the updated sequence of indicators can be selected simultaneously for each indicator in response to satisfying constraints on transitions to selected updated milestones associated with each of the selected updated milestone probabilities so as to form a valid path as defined by the updated search space graph.

In the example of FIG. 8B, at 876 an updated cost function is associated with each edge in the updated search space graph. At 877, an updated milestone probability is selected from the set of updated milestone probabilities for each indicator in the updated sequence of indicators in response to finding an updated path through the updated search space graph that minimizes a combination of updated cost functions associated with each edge traversed by the updated path. The updated path is formed by transitioning from one milestone to another milestone by traversing edges between milestones in the updated search space graph. In this case, the associated probabilities of transitioning between milestones in the updated path are selected in response to the set of updated milestone probabilities for each indicator in the current sequence of indicators.

In some examples, the updated cost function associated with each edge in the updated search space graph traversed by the updated path is a negative logarithm of the updated milestone probability associated with the transition to the particular milestone defined by each edge in the updated search space graph traversed by the updated path. The method and system described herein are not limited to this particular cost function, and other cost functions may be used as known in the art or yet to be developed.

Finally, at 880, each indicator in the updated sequence of indicators is classified in response to the selected updated milestone probabilities, wherein the updated milestone probabilities are selected as described above by using cost functions applied to the updated search space graph.

In some embodiments, to reduce the computational complexity associated with finding a shortest path through the graph that minimizes a combination of cost functions, the set of milestone probabilities is limited to a subset of highest milestone probabilities for each indicator in the sequence of indicators. Reducing the number of probabilities in the set of milestone probabilities effectively reduces the number of milestones considered in classifying an indicator. This reduction in possible milestones to be considered by the system translates to a reduction in the number of possible combinations of milestones or paths through the graph. This in turn translates to a reduction in computational complexity, for instance in applying an algorithm such as Dijkstra's algorithm to determine a shortest path and/or a minimum combination of cost functions that maximizes the likelihood for a given classification or assignment of indicators to milestones. In some embodiments, the system's performance increases by a factor of over 100, over 1000, over 10K, over 50K, over 100K, over 150K, over 200K, and over 500K. This limiting process can be applied to the set of current milestone probabilities for each indictor in the current sequence of indicators and to the set of updated milestone probabilities for each indicator in the updated sequence of indicators.

Accordingly, to reduce the computational complexity associated with finding the current shortest path through the graph that minimizes the combination of current cost functions, the system limits the set of current milestone probabilities to a subset of highest current milestone probabilities for each indicator in the current sequence of indicators and selects the current milestone probability from the limited subset of highest current milestone probabilities. In particular, the current milestone probability is selected in response to finding a current path through the current search space graph that minimizes a combination of current cost functions associated with each edge traversed by the current path. In this case, the current path comprises transitioning from one milestone to another milestone by traversing edges between milestones, and wherein the associated probabilities of transitioning between milestones in the current path are selected in response to the set of current milestone probabilities for each indicator in the current sequence of indicators.

Similarly, to reduce the computational complexity associated with finding the updated shortest path through the graph that minimizes the combination of updated cost functions, the system limits the set of updated milestone probabilities to a subset of highest updated milestone probabilities for each indicator in the updated sequence of indicators and selects the updated milestone probability from the limited subset of highest updated milestone probabilities. In particular, the updated milestone probability is selected in response to finding an updated path through the updated search space graph that minimizes a combination of updated cost functions associated with each edge traversed by the updated path. In this case, the updated path comprises transitioning from one milestone to another milestone by traversing edges between milestones, and wherein the associated probabilities of transitioning between milestones in the updated shortest path are selected in response to the set of updated milestone probabilities for each indicator in the updated sequence of indicators Various methods can be applied to limit the set of milestone probabilities to a subset of highest milestone probabilities for each indicator in the sequence of indicators. In some examples, a threshold is set wherein the subset of highest milestone probabilities includes the probabilities in the original set (i.e., the set of milestone probabilities) that are equal to and/or exceed the threshold. Another method is to designate a number N and limit the subset of highest milestone probabilities to the highest N probabilities in the original set (i.e., the set of milestone probabilities). For example, designating N=3 would limit the subset of highest milestone probabilities to the three highest probabilities in the original set; N=4 would limit the subset to the four highest probabilities and so on for N chosen as an integer value. In some embodiments, N is designated as an integer selected from a set consisting of integers ranging between and including 2 and 10, while in others the set consists of integers ranging between and including 3 and 5.

For example, if a set of milestone probabilities is given by {0.01, 0.45, 0.18, 0.02, 0.31, 0.03}, a threshold of 0.1 can be set to limit the set of milestones to the following subset: {0.45, 0.18, 0.31}. The subset includes the set of milestone probabilities in the original set {0.01, 0.45, 0.18, 0.02, 0.31, 0.03} that are equal to and/or exceed the threshold of 0.1.

In another example, taking the same original set of milestone probabilities {0.01, 0.45, 0.18, 0.02, 0.31, 0.03}, a number N=3 can be designated that limits the subset of highest milestone probabilities to the highest three probabilities in the original set, which in this case, is {0.45, 0.31, 0.18}.

Application to the Shipping Industry

One example of an application where the order of events matters is the use of pseudo-standard codes in the shipping industry to track shipping containers as they move from a point of origin to a final destination. In this case, containers used to ship goods are often moved using various modes of transportation. Moreover, the transfer, loading, and unloading of containers can take place in different locations. Accordingly, one can think of each shipping container as experiencing a series of physical events that happen en route between the origin and final destination of the container's journey. A notable physical event can be viewed as marking a milestone in the container's journey, including for example, sending an empty container to be loaded at a point of origin such as a manufacturer's location, departing the point of origin with a full container by truck, arriving at an intermediate location to be transferred to an ocean carrier, departing the intermediate location by sea, arriving at another intermediate location to be unloaded from the ocean carrier, loading the container to a truck to be transported to a final destination such as a distribution center, unloading the container at the distribution center, and transporting the empty container to a new location for future use.

In the shipping industry, raw data regarding the status of a shipping container used to track the container along its journey is typically generated and sent via EDI, an example of which is provided in FIG. 2A. As shown in FIG. 2A, EDI file 200 in its raw data format does not convey the status of the container in a manner that would be easily understood by an end user.

The problem encountered in this case is that the sequential event data provided as a sequence of EDI files generated and used to track the container as it moves through and experiences a series of physical events along its journey, is received in a form that is not particularly meaningful. To add to the problem, the files may be received out of order due to latencies or delays in generating or transmitting each file. In some cases, a particular file associated with a physical event may be missing entirely, leaving a gap in the sequence (and a gap in the record of the container's history) due to missing data.

In spite of these shortcomings, each EDI file does contain important information regarding the status of the container that would be meaningful if extracted and analyzed in the context of a sequence of EDI files that together track the entire course of the container's journey. In particular, the raw data includes status codes used to indicate the current status of a container along with other information regarding the status of the container. In this case, an EDI message in the form of a data file would be sent each time the shipping container experiences a physical event. Thus, when the empty container is sent to be loaded at a point of origin such as a manufacturer's location, an EDI message corresponding to that physical event would be sent containing a status code and other information related to the event. Subsequently, when the full container departs the point of origin by truck, a subsequent EDI message corresponding to this subsequent physical event would be sent containing a status code and other information related to the subsequent event. In this manner, a sequence of EDI messages is received by an end user such as a manufacturer wanting to track the status of the container, wherein each message contains a status code that corresponds to a physical event experienced by the container along its journey.

For various reasons, the status codes, at least viewed in isolation, provide only partial information regarding the status of a shipping container. First, the status codes are pseudo-standards in that each shipping partner may use the same codes differently, which means the codes cannot be relied upon to mean the same thing if used by different partners. Second, even the same partner may use the codes inconsistently. In some cases, the codes are manually entered by an operator, and are thus subject to both human error and inconsistent use. Third, the codes are generic classifications that exclude important details of a physical event. For example, a single status code is used to denote a container's arrival but fails to indicate how the container arrived (what mode of transportation was used) or whether the container is empty or full. Accordingly, at least when viewed in isolation, the status codes in and of themselves do not convey sufficient detail regarding where the container is and what is being done with the container along its journey.

Current efforts to gain better or improved visibility regarding the actual status of a particular container involve either the hiring of massive teams to manually enter the correct milestones as the raw EDI data is received or the development of a custom set of hard-coded rules to process, decipher, and transform the raw EDI data containing the pseudo-standard codes into a form that provides a meaningful description (e.g., meaningful milestones) of the container's status. Developing customized solutions based on hard-coded rules for each application for each customer is not only inefficient and time-consuming, but is also sub-optimal in that the hard-coded rules are unable to adapt or adjust to changing information or new conditions, for example, when subsequently received messages provide new information or context regarding prior messages which can then be re-evaluated in light of the new information received.

Container milestones correspond to physical events experienced by a shipping container as it moves from one location to another along its journey. Based on industry knowledge, container milestones are defined in this case to represent specific physical milestones that occur within an international ocean container movement. (e.g., physical events experienced by a container along its journey from an origin to a destination).

A container's journey can also be logically divided into trip segments corresponding to, for example, segments that are on land or on the ocean. Each trip segment can be further divided into a mode or stage corresponding to the mode of transportation or a stage (e.g., whether the container is being loaded or unloaded onto a vessel).

FIG. 9 shows a table 900 providing a view of how a container's journey may be logically broken up into trip segments, modes or stages, physical events corresponding to different modes or stages that define container milestones associated with container movement, and the status codes that may be mapped to each container milestone. Additionally, table 900 includes descriptions of each physical event corresponding to a container milestone.

As shown in table 900, the container's journey may be divided into trip segments that include Stuffing, Export Inland Activity, Vessel Activity, Import Inland Activity, and Unstuffing.

Stuffing refers to the process of dispatching an empty container and receiving back a full container by a facility such as an ocean carrier. Stuffing includes milestones M1 and M2, where M1 corresponds to a physical event labeled as "Empty dispatch," which in this case refers to an empty container that has been dispatched by an ocean carrier to be filled by an entity (e.g., a manufacturer). M2 corresponds to an event labeled as "Receipt," which refers to a filled container that has been received by the ocean carrier.

After Stuffing is complete, the container must be transported inland to a port from which a vessel such as an ocean carrier will depart with the container to travel internationally. This trip segment that involves moving inland (within a country or location) to a port for exporting out of a country or location is referred to as Export Inland Activity. The container can be moved inland via truck (drayage) or rail, or it can travel by barge.

Depending on the mode of travel (i.e., drayage, rail, or barge), the container will experience different physical events, which are described or represented by container milestones. As shown in table 900, the Drayage mode includes milestones M3 and M4, where M3 corresponds to an event labeled as "Export drayage depart," which refers to a truck that has departed for container positioning at an export location. In this example, the container is on a truck that has departed a first location inland where it was initially received. M4 corresponds to an event labeled as "Export drayage arrive," which refers to a truck that has arrived for container positioning at the export location. In this example, the truck with the container has arrived at a second location inland (e.g., the port for loading to an ocean carrier).

Traveling by Rail includes milestones M5, M6, M7, and M8. M5 corresponds to a physical event labeled as "Export rail load," which refers to a container that has been loaded onto a train or rail for export at a first location inland. M6 corresponds to a physical event labeled as "Export rail depart," which refers to a train carrying the container that has departed for export.

M7 corresponds to a physical event labeled as "Export rail arrive," which refers to a train carrying the container that has arrived for export. For example, the container has arrived by train at a second location inland (e.g., the port for loading to an ocean carrier). Finally, M8 corresponds to a physical event labeled as "Export rail unload," which refers to a container that has been discharged from the train or rail for export. For example, the container has been unloaded from the train at the second location inland.

Traveling by Barge includes milestones M9, M10, M11, and M12. M9 corresponds to an event labeled as "Export barge load," which refers to a container that has been loaded onto a barge for export. M10 corresponds to an event labeled as "Export barge depart," which refers to a barge that has departed for export (e.g., the container is on a barge that has departed a first location inland). M11 corresponds to an event labeled as "Export barge arrive," which refers to a barge that has arrived for export (e.g., the container is on a barge that has arrived at a second location inland such as a port for loading to an ocean carrier). Finally, M12 corresponds to a physical event labeled as "Export barge unload," which refers to a container that has been discharged from a barge for export (e.g., the container has been unloaded from the barge at the second location inland).

After the container is moved inland to a first port for international transport via a vessel such as an ocean carrier, it enters a trip segment where it will be moving on the vessel on international waters. This trip segment is referred to as "Vessel Activity" and includes the modes and stages of Load to Vessel, Arrival, Drayage, Departure, and Unload from Vessel.

The Load to Vessel stage includes milestones M13 and M14. M13 corresponds to an event labeled as "Vessel load origin," and refers to a container that has been loaded onto a vessel at a first or origin port. Note that because hundreds or even thousands of containers are loaded onto the vessel, there will be a certain passage of time before the vessel will be fully loaded and ready to depart. M14 corresponds to a physical event labeled as "Vessel depart origin," which refers to a vessel that has departed the origin port. Thus, these milestones provide greater specificity and visibility with respect to the container being tracked as they convey when the container was loaded onto the vessel and when it actually departed from the origin port.

The next stages—Arrival, Drayage, and Departure—all refer to transshipment, which is a term used to describe a layover in the container's journey. For example, the shipping container may arrive on a first vessel at a facility in an intermediate port and be transferred via truck (Drayage) to another facility within the intermediate port from which it will depart on a second vessel for transport to a final destination port.

The Arrival stage includes milestones M15 and M16. M15 corresponds to an event labeled as "Vessel arrive transshipment," which refers to a vessel or ocean carrier that has arrived at a port for transshipment. M16 corresponds to a physical event labeled as "Container discharge for transshipment," which refers to a container that has been discharged from a vessel for transshipment (e.g., a container that has been discharged or released from the vessel that brought it to an intermediate port for transshipment).

The Drayage stage is used to describe a container's movement by truck between facilities within the intermediate port and includes milestones M17 and M18. M17 corresponds to a physical event labeled as "Transshipment drayage depart," which refers to a truck that has departed for container positioning at a transshipment location. For example, a container has departed a first facility by truck to be transported to a second facility within an intermediate port for loading onto a second vessel. M18 corresponds to a physical event labeled as "Transshipment drayage arrive," which refers to a truck that has arrived for container positioning at a transshipment location (e.g., the container arriving at the second facility by truck).

The Departure stage includes milestones M19 and M20. M19 corresponds to a physical event labeled as "Vessel load transshipment," which refers to a container that has been loaded onto a vessel for transshipment. For example, a container has been loaded onto the second vessel at the second facility. M20 corresponds to a physical event labeled as "Vessel depart transshipment," which refers to a vessel that has departed the transshipment port (e.g., the second vessel has departed the second facility in the intermediate port).

After the second vessel departs from the intermediate port after transshipment, the vessel arrives at its destination (i.e., a destination port). This happens in the "Unload from Vessel state," which includes milestone M21 corresponding to a physical event labeled as "Vessel arrive destination," which refers to a vessel that has arrived at a destination port. This milestone is followed by milestone M22 corresponding to a physical event labeled as "Vessel discharge destination," which refers to a container that has been discharged from a vessel at a destination port. In this case, the container has been discharged or released from the second vessel at the final destination port.

After arriving and being discharged at the final destination port, the container may need to be moved inland to its final destination, which may be some distance inland from the final destination port. This trip segment is referred to as Import Inland Activity, reflecting the container being imported and moved inland.

As in the case of the Export Inland Activity trip segment, the container can be moved inland via truck (drayage) or rail, or it can travel by barge. Accordingly, the modes, stages, and milestones for the Import Inland Activity trip segment are analogous to the Export Inland Activity trip segment. For the sake of completeness, these modes, stages and milestones are described below.

The Drayage mode includes milestones M23 and M24, where M23 corresponds to a physical event labeled as "Import drayage depart," which refers to a truck that has departed for container positioning at an import location. For example, the container is on a truck that has departed a first location (e.g., the final destination port where it arrived). M24 corresponds to a physical event labeled as "Import drayage arrive," which refers to a truck that has arrived for container positioning at an import location. For example, the container is on a truck that has arrived at a second location inland (e.g., a final facility of the carrier entity).

Traveling by Rail includes milestones M25, M26, M27, and M28. M25 corresponds to a physical event labeled as "Import rail load," which refers to a container that has been loaded onto a train or rail at an import location for transport inland. M26 corresponds to a physical event labeled as "Import rail depart," which refers to a train that has departed at an import location. In this case, the container has departed a first location (e.g., the final destination port where it arrived) by train. M27 corresponds to a physical event labeled as "Import rail arrive," which refers to a train that has arrived for import. For example, the container has arrived at a second location inland (e.g., a final facility of the carrier entity) by train. Finally, M28 corresponds to a physical event labeled as "Import rail unload," which refers to a container that has been discharged from rail for import. Here, the container has been unloaded from the train at the second location inland.

Traveling by Barge includes milestones M29, M30, M31, and M32. M29 corresponds to a physical event labeled as "Import barge load," which refers to a container that has been loaded onto a barge at an import location. For example, the container has been loaded onto a barge for transport inland after having arrived at the final destination port. M30 corresponds to a physical event labeled as "Import barge depart," which refers to the container departing a first location inland (e.g., the final destination port where it arrived) by barge. M31 corresponds to a physical event labeled as "Import barge arrive," which refers to a barge that has departed at an import location. For example, the container has arrived at a second location inland (e.g., a final facility of the carrier entity) by barge. Finally, M32 corresponds to a physical event labeled as "Import barge unload," which refers to a container that has been discharged from a barge for import. For example, the container has been unloaded from the barge at the second location inland.

After arriving at the second location inland, the container has been delivered by the carrier company to the last location or facility where the carrier company will go. This trip segment is referred to as Unstuffing and includes milestones M33, M34, M35 and M36. At this point, the container has cleared customs, the freight has been paid for and the container is "Available for delivery," a physical event marked by milestone M33. "Available for delivery" can refer to a container that is available for delivery, including for example, a container available for pick-up that is at a rail ramp, an inland yard, or is at a terminal.

Next, a trucker will come and pick up the container from the carrier's facility and will head towards its final destination (e.g., the manufacturer's distribution center). At this point, the container is "Out for delivery," a physical event marked by milestone M34. When the container actually arrives at its final destination such as a distribution center, the container is "At final delivery location," an event description marked by milestone M35, which refers to a container that has been delivered. The container is then unloaded for example at a distribution center and the empty container is brought back by the trucker to the carrier facility for reuse by the ocean carrier. This is described as an "Empty return," an event description marked by milestone M36, which refers to an empty container that has been returned to carrier.

The container milestones M1 through M36 as described above are defined to represent the physical events experienced by the container in a more meaningful form than the status codes extracted from the EDI files. Examples of status codes that may be mapped to each container milestone are also provided in Table 900.

The status codes used to convey physical events describe those events in more generic terms, providing less detail than the milestone descriptions. In particular, the mapping from status code to milestone is not a simple one-to-one relationship, but rather, some of the same status codes are used to describe different events or milestones and there can be more than one status code associated with the same event or milestone.

For example, the status code "I" is used to denote the generic event of a container's arrival but fails to indicate important details about that arrival including how the container arrived (what mode of transportation was used), at which point in its journey the container is located (e.g., which trip segment, stage, or mode), and whether the container is empty or full. As indicated by the table of FIG. 9, "I" can be used to indicate: Receipt (M2), Export drayage arrive (M4), Export rail arrive (M7), Transshipment drayage arrive (M18), Import drayage arrive (M24), Import rail arrive (M27), and Empty return (M36).

Similarly, the status code "OA" is used to denote the generic event of a container's departure from a facility (i.e., that the container "gated-out"), but again fails to provide details about that departure including how the container departed, at which point in its journey the container is located (e.g., which trip segment, stage, or mode), and whether the container is empty or full. Table 900 shows that "OA" can be used to indicate Empty dispatch (M1), Export drayage depart (M3), Transshipment drayage depart (M17), Import drayage depart (M23), and Out for delivery (M34).

Other examples where a status code is used to indicate more than one milestone event include the status code "VD,"

used to denote the generic event of a vessel departing a location, and "VA," used to denote the generic event of a vessel arriving at a location. Accordingly, "VD" can be used to indicate Vessel depart origin (M14) and Vessel depart transshipment (M20) and "VA" can be used to indicate Vessel arrive transshipment (M15) and Vessel arrive destination (M21).

The examples described above illustrate the deficiency of the status codes in conveying and tracking the actual status or physical events being experienced by the container. Because the status codes refer to generic events, they fail to distinguish between specific milestones that occur and mark a container's journey. Taking an example described above, while "VD" indicates a vessel's departure from a location, it fails to distinguish between whether a vessel is departing from its origin port (i.e., Vessel depart origin) or whether it is departing from an intermediate port during transshipment (i.e., Vessel depart transshipment). Thus, a sequence of status codes received and extracted from EDI files consisting of the status codes VD, VA, VA, if viewed in isolation would merely convey that a vessel departed from a location, arrived at a location, and arrived at a location. Using the system and method described herein, however, the sequence of status codes can be classified as, for example, Vessel depart origin (M14), Vessel arrive transshipment (M15), and Vessel arrive destination (M21). Extracting other information or features such as a location associated with each status code can provide further details in tracking the container.

The structure shown in Table 900 where the container's journey has been divided into trip segments, modes and stages, and individual milestones suggests a logical order to the series of physical events experienced by the container as they would happen in the real world. In this case, the possible series of real-world physical events corresponds to an order in transitions to the various milestones corresponding to each physical event as described in Table 900. For example, an order of events follows due to the fact that a container would have to be received by the carrier company before it can be exported inland to the origin port. Translating this into milestones, Empty Dispatch (M1) and Receipt (M2) would have to happen before Export drayage depart (M3), Export rail depart (M6), or Export barge depart (M10), since exporting inland to the origin port can be done via drayage, rail, or barge. Similarly, the container would have to be loaded to a vessel before that vessel can depart from a port. In terms of ordering events that corresponds to an order in milestone transitions, this means that a transition to Vessel load origin (M13) must happen before a transition to Vessel depart origin (M14).

In addition, given an occurrence of a particular event associated with a given milestone, a set of next events corresponding to a transition to a next milestone from the given milestone may be limited by certain constraints. For example, a truck transporting the container inland to a port departs from one location (e.g., the carrier's receiving facility) and arrives in a different location (e.g., the origin port). Thus, a transition between milestones from Export drayage depart (M3) to Export drayage arrive (M4) requires that M4 is a different location than M3. Accordingly, the transition from M3 to M4 is constrained to different locations. In contrast, the transition from Receipt (M2) to Export drayage depart (M3) would be constrained to the same location since the truck would be departing from the same location (i.e., the carrier's receiving facility) where the container was received.

Figure 10:
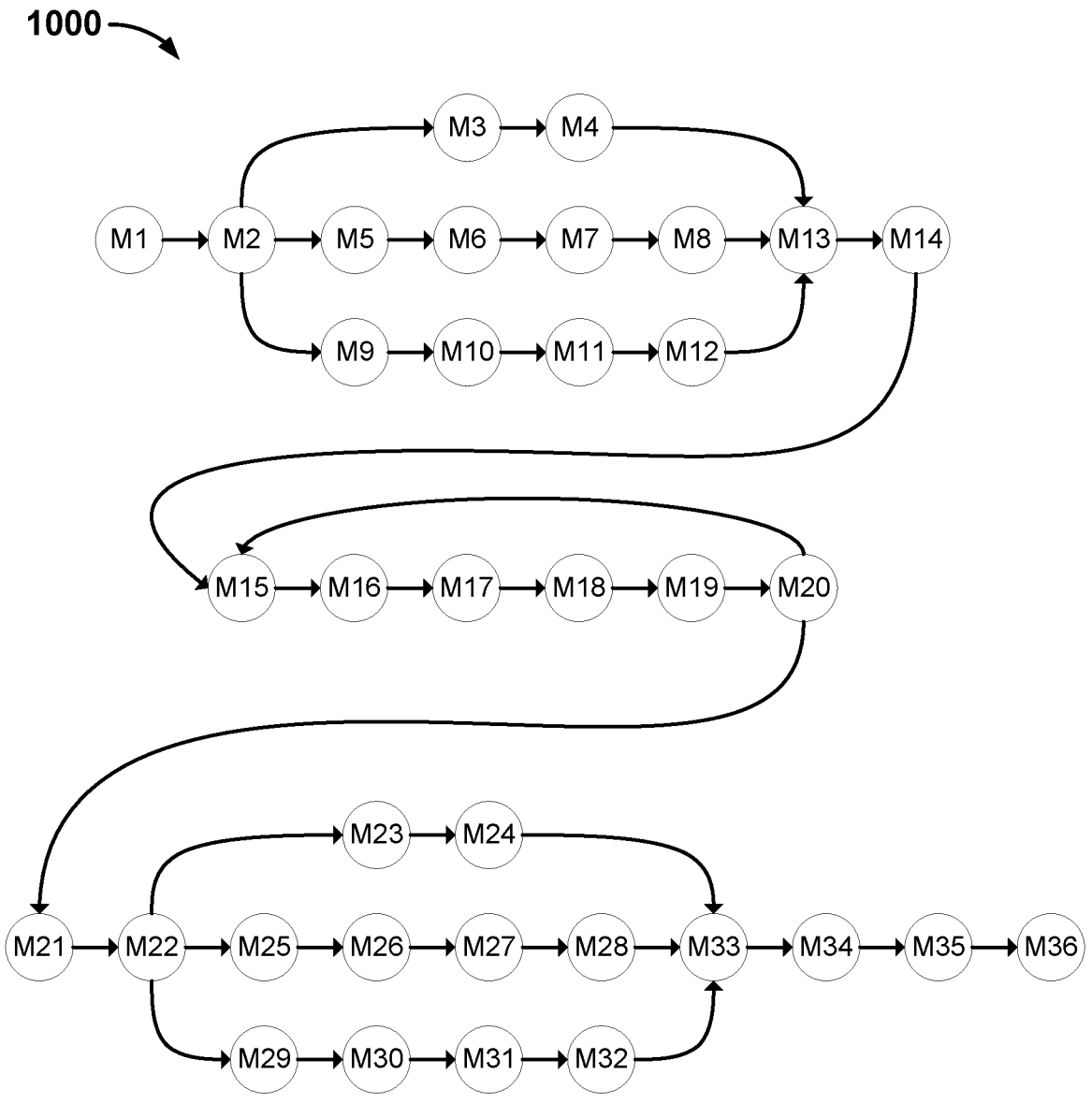
FIG. 10 shows an exemplary embodiment of a container milestone graph that provides an ordering of the set of particular milestones defined for international ocean container movement.

The ordering of milestones and constraints associated with transitions to milestones as described in the examples above are provided by a container milestone graph as shown in FIG. 10. The graph comprises nodes connected by edges, each node having a state and being associated with a particular milestone in the set of possible milestones. Each edge defines a transition from one node to another node and each edge can have an associated cost of transitioning between nodes.

FIG. 10 shows an exemplary embodiment of a container milestone graph 1000 that provides an ordering of the set of particular milestones defined for international ocean container movement. The container milestone graph 1000 comprises sequences of nodes connected by edges. Each node (denoted as "M1" through "M36" in FIG. 10) represents a particular milestone and each edge (shown as an arrow connecting two nodes in FIG. 10) defines a transition from one milestone to another milestone. Each edge has an associated probability of transitioning to the milestone to which the arrow is pointing. Additionally, one or more constraints (e.g., rules) applied to an edge defining a transition from a given node representing a milestone to a subsequent node representing another milestone constrain the transition from the given node to the subsequent node. These constraints serve to constrain the transition from the given milestone to the subsequent milestone. An example of a constraint on a transition is a rule that the transition from one milestone to another milestone can only happen if the locations of the two milestones are different (or alternatively, if they are the same).

The container milestone graph defines a valid ordered sequence of transitions to all possible milestones defined for a given application (which in this case is a shipping container application) and the various constraints associated with each transition from one milestone in the ordered sequence to another milestone in the ordered sequence. Here, a valid ordered sequence of transitions corresponds to a classification of a sequential order of physical events that is physically possible in the real world, where the sequential order of physical events is defined by the current or updated sequence of indicators (e.g., status codes extracted from received EDI files) depending on which indicators (e.g., status codes) are being classified.

Note that there can be many valid ordered sequence of transitions to milestones. Thus, the graph is configured to include a plurality of valid ordered sequences of transitions to milestones, each of which can be embodied by a path through the graph 1000. The path is created by transitioning from one milestone to another milestone by traversing edges between milestones.

As described in the examples above, a system and method for processing physical events related to container shipping includes receiving a series of raw data files, wherein each raw data file is associated with a physical event in a series of sequential physical events. In this example, the raw data files are EDI files that are parsed and converted into JSON objects for further processing. Next, a sequence of indicators in response to the received series of raw data files is formed. Here, the indicators are status codes extracted from the received EDI files.

Forming a sequence of indicators includes processing each raw data file in a series of raw data files to extract an indicator and a set of features from each raw data file. The indicator and the set of features are associated with the physical event associated with the raw data file. A set of milestone probabilities associated with each indicator is generated in response to the extracted set of features from each raw data file from which the indicator is extracted.

For example, referring to FIG. 1B, a current indicator of a current physical event is received in an EDI file where the current indicator is the status code VD. The EDI file is saved in a data store and the current identifier is extracted from the file. The current identifier associates the current indicator with an entity, which in this case is the shipping container being tracked and associated with the received EDI file and the status code VA. Using the current identifier, an EDI parser (e.g., Parser 140 of FIG. 1A) pulls the EDI file corresponding to the shipping container being tracked and processes and parses the EDI file to convert it into a JSON object. Features are extracted from the JSON object and used to generate milestone probabilities representing the likelihood that the status code VA corresponds to one of the possible milestones M1 through M36 for the shipping container being tracked. Machine learning techniques are used to generate the milestone probabilities for the status code VA based on the extracted features.

Referring to FIGS. 1A and 1B, using the current identifier corresponding to the shipping container being tracked, the method (e.g., using Sequential Event Analyzer 160) pulls a history of indicators, which in this case are status codes associated with the shipping container being tracked, extracting the status codes to form a sequence and classifying each status code in the sequence to generate a classification into meaningful milestones from the set of milestones M1 through M36. In order to do this, a process sequence of three indicators VD, VA, VA is ordered in the order in which each status code was received by the system, as shown by the designation of an Indicator value 1, 2, and 3, designating the first, second, and third indicator respectively in the sequence of three indicators.

To account for real world constraints, the system references the container milestone graph 1000 of FIG. 10 and generates a current search space graph (not shown). In particular, the system references container milestone graph 1000 based on or in response to the sequence of three indicators VD, VA, VA in order to form a subset of a complete search space graph by applying constraints provided by the container milestone graph 1000 to the complete search space graph. In this case, the table 900 of FIG. 9 shows that the status code "VD" is associated with milestones M14 (Vessel depart origin) and M20 (Vessel depart transshipment), while the status code "VA" is associated with milestones M15 (Vessel arrive transshipment) and M21 (Vessel arrive destination). Accordingly, a current search space graph is generated based on or in response to the milestones associated with the status codes taken from the current sequence of three indicators along with any associated constraints on transitions.

Using features extracted from each EDI file containing each status code, the system generates the following milestone probabilities of each status being a particular milestone using machine learning techniques:

| Indicator | Status | Location | Vessel Depart Origin | Vessel Depart Transshipment | Vessel Arrive Transshipment | Vessel Arrive Destination |
|---|---|---|---|---|---|---|
| 1 | VD | Shanghai | 0.8 | 0.2 | 0.0 | 0.0 |
| 2 | VA | Hong Kong | 0.0 | 0.0 | 0.4 | 0.6 |
| 3 | VA | Singapore | 0.0 | 0.0 | 0.3 | 0.7 | following steps as depicted in the exemplary methods of FIGS. 3A-B, 4A-B, 6A-B, 7A-B, and 8A-B may be used. In particular, milestone probabilities are generated based on extracted features for each status code in the sequence and a container milestone graph 1000 as shown in FIG. 10 is referenced to generate a search space graph (not shown) for selecting milestone probabilities to determine the classification result (see e.g., the methods depicted in FIGS. 6A-B, 7A-B, and 8A-B). Examples of extracted features from the files and sequence of files include a time or a location associated with the status code, the previous or next status code in the sequence, whether the container has been loaded or discharged, and other features found to have predictive value.

Returning to the shipping container example, recall that the current indicator is the status code VA. Pulling a history of container statuses for the identified shipping container results in the following sequence of status codes and locations, where an associated location has also been extracted from the EDI files along with other features corresponding to each status code:

| Indicator | Status | Location |
|---|---|---|
| 1 | VD | Shanghai |
| 2 | VA | Hong Kong |
| 3 | VA | Singapore |

Note that the current indicator VA that occurred in Singapore is appended to the end of the sequence and the Using these milestone probabilities, the disclosed system is configured to find the highest probability assignment of labels to each status code across the entire history of the container's journey thus far that does not violate the order and constraints defined by the container milestone graph. Note that simply assigning the highest probability label for each status code would result in a classification of: Vessel depart origin (M14)→Vessel arrive destination (M21) →Vessel arrive destination (M21) as the predicted sequence of milestones in the container's journey. Taking the product of the associated milestone probabilities 0.8, 0.6, and 0.7 results in a probability of 0.336 for this predicted sequence.

But referring to the container milestone graph 1000 of FIG. 10, the transition Vessel arrive destination (M21) →Vessel arrive destination (M21) is invalid because there is no edge that connects M21 to itself. This makes sense because a vessel cannot arrive at its final destination twice. Thus, we know the predicted sequence of milestones that simply maximizes a product of the individual milestone probabilities is incorrect because the predicted sequence of milestones cannot actually happen in the real world.

Applying the valid order of transitions and constraints provided by the container milestone graph 1000 of FIG. 10 results in a classification of: Vessel depart origin (M14) →Vessel arrive transshipment (M15)→Vessel arrive destination (M21) as the predicted sequence. Taking the product of the associated milestone probabilities 0.8, 0.4, and 0.7 results in a probability of 0.224 for this predicted sequence. In this manner, the system provides the highest probability assignment of labels to each status code across the container's history that comports with real-world constraints.

An advantage of the method and system described herein is that each time a new file is received having a new indicator, the new file is processed, the indicator is appended to the current sequence of indicators, and a classification result is determined based on re-evaluating and re-assigning labels to each indicator in the new sequence of indicators that maximizes the probability of the predicted sequence of milestones over the entire history of the container's movement while satisfying real world constraints. Thus, the prediction is adjusted not just automatically but also essentially in real-time as each new piece of information is received and processed to provide an improved prediction based on all available information received regarding the movement of the container.

A process of re-labeling an entire history of status codes tracking the movement of a container can be described with respect to the example above. Specifically, suppose a subsequent EDI file is received having a subsequent indicator. Here, a fourth EDI file is received having the status code VA and an associated location of Oakland. The system appends the fourth indicator or status code to the current sequence of three indicators or status codes to form a subsequent sequence of four indicators or status codes and generates milestone probabilities for each of the four indicators or status codes based on extracted features from the EDI files and sequence of EDI files, including the most recently received fourth EDI file. Accordingly, the milestone probabilities generated for each indicator or status code in the sequence of four indicators or status codes are corrected or adjusted to include the new information provided in the most recently received fourth EDI file.

Applying the system and method described herein, the following milestone probabilities are generated for the subsequent sequence of four indicators or status codes:

In this particular example, the updated milestone probabilities applied to the updated search space graph are not the same as the current milestone probabilities previously applied to the current search space graph as described above. In this case, the milestone probabilities are re-generated for each indicator or status code in the subsequent sequence of four indicators or status codes to obtain an updated valid order of transitions and constraints to the subsequent sequence of four indicators or status codes. This results in a predicted sequence of: Vessel depart origin (M14)→Vessel arrive transshipment (M15)→Vessel arrive transshipment (M15)→Vessel arrive destination (M21). Significantly, the VA in Singapore previously classified as a Vessel arrive destination (M21) is re-classified or re-assigned a label of Vessel arrive transshipment (M15) in light of the subsequent status code VA in Oakland received in the fourth EDI file.

Note that the regenerated milestone probabilities at least for the status code VA in Singapore reflect an adjustment based on the newly received information (i.e., the subsequent status code VA in Oakland). In the previous example for the sequence of three indicators, the VA in Singapore was the last status code in the sequence of three indicators and the milestone probabilities generated to predict a classification result were 0.3 for Vessel arrive transshipment (M15) and 0.7 for Vessel arrive destination (M21). However, after receiving the subsequent indicator VA in Oakland, the VA in Singapore becomes the third status code in a series of four status codes. The impact of receiving the fourth status code, VA in Oakland, is reflected in the change in the milestone probabilities generated for the third status code VA in Singapore, which are now 0.7 for Vessel arrive transshipment and 0.3 for Vessel arrive destination.

This change in predicted probabilities makes sense given that the VA in Oakland is no longer the last VA received in

| Indicator | Status | Location | Vessel Depart Origin | Vessel Depart Transshipment | Vessel Arrive Transshipment | Vessel Arrive Destination |
|---|---|---|---|---|---|---|
| 1 | VD | Shanghai | 0.8 | 0.2 | 0.0 | 0.0 |
| 2 | VA | Hong Kong | 0.0 | 0.0 | 0.4 | 0.6 |
| 3 | VA | Singapore | 0.0 | 0.0 | 0.7 | 0.3 |
| 4 | VA | Oakland | 0.0 | 0.0 | 0.4 | 0.6 |

In this case, knowing that a VA in Oakland is received after the VA in Singapore informs the previous classification decision (i.e., the decision made for each status code in the sequence of three status codes in the example above) to classify the VA in Singapore as a Vessel arrive destination (M21).

As in the case of processing the current sequence of three indicators as described above, the system references the container milestone graph 1000 of FIG. 10 to generate an updated search space graph (not shown) in response to the updated sequence of four indicators or status codes, which in this case is the sequence VD, VA, VA, VA. Here, the status codes "VD" and "VA" are the same as in the case of the current sequence of three indicators, and thus, looking at the table 900 of FIG. 9 provides the same milestones in this case. In particular, "VD" is associated with milestones M14 (Vessel depart origin) and M20 (Vessel depart transshipment), while the status code "VA" is associated with milestones M15 (Vessel arrive transshipment) and M21 (Vessel arrive destination). Accordingly, an updated search space graph is generated based on or in response to the milestones associated with the status codes taken from the updated sequence of four indicators or status codes.

the sequence, which means that it is likely that the container has not finished its journey over vessels and has not yet arrived at the vessel destination. Instead, the predicted sequence of milestones suggests that the container is being transshipped over more than one port or more than one layover. This possibility is indicated by the transition or edge from milestone Vessel depart transshipment (M20) to milestone Vessel arrive transshipment (M15) on the updated search space graph.

It is also worth noting that not all possible transitions are shown in the container milestone graph 1000 of FIG. 10 as this would overly complicate the graph. For example, container movement in the Export Inland Activity and Import Inland Activity can include transitions using combinations of drayage, rail, and barge that would be represented by edges between the appropriate milestones. All such transitions are not depicted in the graph 1000 shown in FIG. 10, which is meant only to provide an example. Other graphs showing other milestones and transitions can be used and applied to the method and system as described herein.

FIG. 11 is a flowchart showing an exemplary process 1100 performed by an exemplary system such as the system 100 of FIG. 1A for classifying each indicator in a sequence of indicators by referencing a milestone graph and generating a search space graph in response to the referenced milestone graph and the sequence of indicators.

At 1110, the system selects a first indicator in a sequence of indicators.

At 1120, the system assigns a label to the selected indicator in response to a plurality or a set of milestone probabilities associated with the selected indicator. Note that each probability in the plurality or set of milestone probabilities is associated with a particular milestone from a set of possible milestones.

At 1122, the system references a milestone graph defining a valid ordered sequence of transitions to milestones and constraints associated with each transition from one milestone to another milestone in the milestone graph.

At 1124, the system generates a search space graph comprising a set of valid paths through a set of milestones in the search space graph, wherein the set of milestones in the search space graph is determined or selected by referencing the milestone graph in response to the sequence of indicators.

At 1130, the system selects a node on the search space graph in response to the assigned label. Each node in the search space graph is associated with a particular milestone from a set of possible milestones.

At 1140, the system defines a state for the selected node in response to the assigned label and the set of milestone probabilities associated with the selected indicator. In some embodiments, the defined state for the selected node includes: a current assigned label of the selected indicator; a current cost associated with assigning the assigned label to the selected indicator; a set of unchosen milestones from the set of possible milestones; and a set of unapplied milestone probabilities, wherein each probability in the set of unapplied milestone probabilities corresponds to an unchosen milestone. The current cost associated with assigning the assigned label to the selected indicator can be determined by various cost functions including for example, taking a negative logarithm of the corresponding milestone probability of the chosen milestone to which the assigned label corresponds.

At 1150, the system determines whether it has reached the end of the sequence of indicators.

At 1160, in response to determining that the selected indicator is not a last indicator in the sequence of indicators, the system selects a next indicator in the sequence of indicators to be the selected indicator.

At 1170, the system selects a transition to a next node on the search space graph in response to a set of milestone probabilities associated with the selected indicator, the selected transition having an associated milestone and an associated milestone probability, the associated milestone probability being one probability in the set of milestone probabilities associated with the selected indicator. In some embodiments, the system determines a cost for the selected transition in response to the associated milestone probability. The cost can be determined by various cost functions including for example, taking a negative logarithm of the associated milestone probability.

At 1180, the system assigns a label to the selected indicator in response to the selected transition, the assigned label corresponding to the associated milestone.

The system then proceeds to step 1130 to select a node on the search space graph in response to the assigned label for the selected indicator, to 1140 to define a state for the selected node in response to the assigned label and the set of milestone probabilities associated with the selected indicator, and to 1150 to determine whether the end of the sequence has been reached. If the end of the sequence has not been reached, the system repeats steps 1160, 1170, 1180, 1130, and 1140 until the last indicator has been selected and assigned a label. At 1190, the system has completed processing each indicator in the sequence and can return a classification result comprising a predicted sequence of milestones corresponding to the sequence of indicators.

In some embodiments, the transition to the next node on the search space graph is selected in response to satisfying any constraints on the edge defining the transition. The process can also include determining a cost for the selected transition in response to the associated milestone probability. Various cost functions can be used to determine the cost for the selected transition, including for example, taking a negative log of the associated milestone probability.

In some embodiments, the system applies a search algorithm to determine a shortest path in the search space graph that minimizes a cumulative cost associated with edges traversed by the determined path without violating any constraints on the traversed edges of the determined path. In particular, the steps of assigning a label to the selected indicator in response to a set of milestone probabilities associated with the selected indicator, selecting a transition to a next node on the search space graph in response to a set of milestone probabilities associated with the selected indicator, and assigning a label to the selected indicator in response to the selected transition are performed by applying the search algorithm to determine the shortest path in the search space graph that minimizes the cumulative cost associated with edges traversed by the determined path without violating any constraints on the traversed edges of the determined path. In some embodiments, the shortest path in the search space graph is determined by applying a uniform cost search algorithm. In the example shown, the shortest path in the search space graph is determined by applying Dijkstra's algorithm.

In some embodiments, forming a sequence of indicators in response to the received series of raw data files comprises detecting and removing duplications of indicators from the sequence of indicators. This reduces a computational complexity in applying the algorithm to find the shortest path through the search space graph. In some embodiments, the system's performance speed increases by a factor of over 10, 50, 100, 200, 500, and 1000 as a result of deduping to remove duplications.

The system can also limit the set of milestone probabilities associated with the selected indicator to a subset of highest milestone probabilities associated with the selected indicator. Limiting the set of milestone probabilities limits the set of milestones that the system can assign as labels to each indicator, reducing the number of different possible combinations of assignments for the system to search to find an optimal solution that maximizes the product of the milestone probabilities of the indicators over the sequence of indicators while not violating the constraints of the search space graph. Accordingly, limiting the set of milestone probabilities and possible milestones for assigning labels also reduces a computational complexity in applying the algorithm to find the shortest path through the search space graph.

In some examples, the set of milestone probabilities associated with each indicator includes a probability of rejection for each indicator. The probability of rejection permits the system to assign a label to the indicator rejecting the indicator as bad data that should not be considered in making a prediction. A rejection of the indicator may be appropriate in the case of an error or where the indicator was received out of chronological order in the sequence due to a delay or latency in transmission of the indicator. In this case, the probability of rejection is assigned to the selected indicator in response to determining that the shortest path in the search space graph that minimizes the cumulative cost associated with edges traversed by the determined path without violating any constraints on the traversed edges of the determined path is a path that excludes associating the selected indicator with a node on the search space graph.

Returning to the shipping container example, the method of FIG. 11 can be applied to the sequence of status codes extracted from the received EDI files by the system and method described with respect to FIGS. 1A and 1B. In this case, the selected first indicator is a status code and the assigned label is selected from the set of possible container milestones defined as M1 through M36 and shown in FIGS. 9 and 10. A probability of transitioning to each of these milestones M1 through M36 is generated in response to data and features extracted from the EDI file containing the status code using machine learning techniques. This results in a set of milestone probabilities associated with the selected status code.

In the example above for the sequence of three indicators, recall that a sequence of three indicators was formed with the following generated milestone probabilities:

| Indicator | Status | Location | Vessel Depart Origin | Vessel Depart Transshipment | Vessel Arrive Transshipment | Vessel Arrive Destination |
|---|---|---|---|---|---|---|
| 1 | VD | Shanghai | 0.8 | 0.2 | 0.0 | 0.0 |
| 2 | VA | Hong Kong | 0.0 | 0.0 | 0.4 | 0.6 |
| 3 | VA | Singapore | 0.0 | 0.0 | 0.3 | 0.7 |

Applying the process 1100 of FIG. 11 to this sequence of three indicators, a first indicator is selected at 1110 and assigned a label in response to a set of milestone probabilities associated with the selected indicator at 1120. In this case, the first indicator (designated by an Indicator value of 1 in the table) is the status code VD in Shanghai. Since this is the first indicator to be assigned a label, the milestone with the highest probability is selected as the assigned label, which in this case is Vessel depart origin (M14) with an associated milestone probability of 0.8.

Next, at 1122, the system references a milestone graph defining a valid ordered sequence of transitions to milestones and constraints associated with each transition from one milestone to another milestone in the milestone graph. Here, the system references the container milestone graph 1000 of FIG. 10 and generates a current search space graph (not shown). In particular, the system references container milestone graph 1000 based on or in response to the sequence of three indicators VD, VA, VA in order to form a subset of a complete search space graph by applying constraints provided by the container milestone graph 1000 to the complete search space graph. The table 900 of FIG. 9 shows that the status code "VD" is associated with milestones M14 (Vessel depart origin) and M20 (Vessel depart transshipment), while the status code "VA" is associated with milestones M15 (Vessel arrive transshipment) and M21 (Vessel arrive destination). Accordingly, a current search space graph is generated based on or in response to the milestones associated with the status codes taken from the current sequence of three indicators at 1124.

At 1130, a node is selected from the set of nodes on the current search space graph in response to the assigned label, Vessel depart origin (M14). In this case, the node selected corresponds to the milestone of the assigned label M14.

Applying the step at 1140, the selected indicator is VD in Shanghai and a state is defined for the selected node M14 in response to the assigned label, Vessel depart origin (M14) having an associated probability of 0.8. The state comprises the current assigned label of the selected indicator (Vessel depart origin (M14)), a current cost associated with this assignment of 0.09691 (i.e., the negative logarithm of 0.8), the set of unchosen milestones {Vessel depart transshipment (M20), Vessel arrive transshipment (M15), Vessel arrive destination (M21)}, and the set of unapplied milestone probabilities {0.2, 0, 0} corresponding to M20, M15, and M21 respectively.

At 1150, the system determines that the end of the sequence of indicators has not been reached and selects a next indicator in the sequence of indicators to be the selected indicator at 1160. Here, the next indicator is the status code VA in Hong Kong.

At 1170, the system selects a transition to a next node on the current search space graph in response to a set of milestone probabilities associated with the selected indicator, which is now VA in Hong Kong. The transition to the next node on the current search space graph is selected in response to satisfying any constraints on the edge defining the transition. Applying Dijkstra's algorithm to determine a shortest path in the graph that minimizes a cumulative cost associated with edges traversed by the determined path without violating any constraints on the traversed edges of the determined path results in selecting a transition to M15 on the current search space graph, corresponding to assigning the label of Vessel arrive transshipment (M15) to the status code VA in Hong Kong at 1180.

The system then proceeds to step 1130 to select node M15 on the current search space graph and defines a state for the selected node at 1140. The state for node M15 comprises the current assigned label of the selected indicator (Vessel arrive transshipment (M15)), a current cost associated with this assignment of 0.39794 (i.e., the negative logarithm of 0.4), the set of unchosen milestones {Vessel depart origin (M14), Vessel depart transshipment (M20), Vessel arrive destination (M21)}, and the set of unapplied milestone probabilities {0, 0, 0.6} corresponding to M14, M20, and M21 respectively.

At 1150, the system determines that the end of the sequence of indicators has not been reached and selects a next indicator in the sequence of indicators to be the selected indicator at 1160. Here, the next indicator is the status code VA in Singapore.

At 1170, the system selects a transition to a next node on the current search space graph in response to a set of milestone probabilities associated with the selected indicator, which is now VA in Singapore. The transition to the next node on the current search space graph is selected in response to satisfying any constraints on the edge defining the transition. Applying Dijkstra's algorithm to determine a shortest path in the current search space graph that minimizes a cumulative cost associated with edges traversed by the determined path without violating any constraints on the traversed edges of the determined path results in selecting a transition to M21 on the current search space graph, corresponding to assigning the label of Vessel arrive destination (M21) to the status code VA in Singapore at 1180.

The system then proceeds to step 1130 to select node M21 on the current search space graph and defines a state for the selected node at 1140. The state for node M21 comprises the current assigned label of the selected indicator (Vessel arrive destination (M21)), a current cost associated with this assignment of 0.15490 (i.e., the negative logarithm of 0.7), the set of unchosen milestones {Vessel depart origin (M14), Vessel depart transshipment (M20), and Vessel arrive transshipment (M15)}, and the set of unapplied milestone probabilities {0, 0, 0.3} corresponding to M14, M15, and M20 respectively.

At 1150, the system determines that the end of the sequence of indicators has been reached and returns the classification result of the predicted sequence of milestones, which in this case is given by the assigned labels: Vessel depart origin (M14)→Vessel arrive transshipment (M15) →Vessel arrive destination (M21).

FIG. 12 shows a screenshot 1200 depicting an exemplary sequence of status codes 1201 contained in a sequence of messages received for a shipping container and a sequence of predicted milestones 1202 corresponding to each status code. Note that as shown by the screenshot 1200, duplicates of every message were received by the system. To speed up the system's performance, a deduping process was performed to detect and remove the duplicate messages resulting in a substantial performance increase. Specifically, with deduping the system generated a classification result comproblem resulted in searching only 31 nodes. Here, the reduction in the search space translates to a factor of about 130,000× performance increase. In other embodiments, the system's performance increases by a factor of over 100, over 1000, over 10K, over 50K, over 100K, 150K, 200K, and 500K.

The system can also limit the set of milestone probabilities associated with the selected indicator to a subset of highest milestone probabilities associated with the selected indicator. Limiting the set of milestone probabilities limits the set of milestones that the system can assign as labels to each indicator, reducing the number of different possible combinations of assignments for the system to search to find an optimal solution that maximizes the product of the milestone probabilities of the indicators over the sequence of indicators while not violating the constraints of the milestone graph. Accordingly, limiting the set of milestone probabilities and possible milestones for assigning labels also reduces a computational complexity in applying the algorithm to find the shortest path in the search space graph.

As described above, in some examples the set of milestone probabilities associated with each indicator includes a probability of rejection for each indicator, essentially allowing the system to throw out bad data so that it does not impact the prediction for the remaining presumably good data.

Taking an example for a sequence of three indicators and generating a probability of rejection for each status code, the probability representing the likelihood that the data associated with the status code is bad data, in addition to generating milestone probabilities results in the following:

| Indicator | Status | Location | Vessel Depart Origin | Vessel Depart Transshipment | Vessel Arrive Transshipment | Vessel Arrive Destination | BAD DATA |
|---|---|---|---|---|---|---|---|
| 1 | VD | Shanghai | 0.7 | 0.2 | 0.0 | 0.0 | 0.1 |
| 2 | VD | Shanghai | 0.6 | 0.0 | 0.0 | 0.0 | 0.4 |
| 3 | VA | Oakland | 0.0 | 0.0 | 0.0 | 1.0 | 0.0 | prising the sequence of predicted milestones in 0.0972 seconds. Without deduping, the system took 12.3796 seconds to generate the same result. Here, the deduping process increased the speed of the system by a factor of 127. In other embodiments, the system's performance speed increases by a factor of over 10, 50, 100, 200, 500, and 1000 as a result of deduping to remove duplications.

Additionally, by applying graph techniques and modeling the problem as a graph problem, the system is able to enforce constraints on the problem while finding the maximum likelihood assignment of milestone labels with significantly better performance than brute-force searching all possible milestone assignments.

FIG. 13 shows a screenshot of a classification result from an exemplary system applied to tracking a shipping container. As shown in FIG. 13, the screenshot 1300 depicts an exemplary sequence of status codes 1301 contained in a sequence of messages received for a shipping container and a sequence of predicted milestones 1302 corresponding to each status code. In the example shown, generating milestone probabilities for each status code results in 4,082,400 possible combinations of milestones based on the generated set of milestone probabilities. But modeling the problem by referencing a container milestone graph 1000 as shown in FIG. 10 to generate a search space graph and applying a uniform cost search algorithm to find the shortest path in the search space graph that satisfies the constraints of the Selecting the highest probabilities in this case results in the following predicted sequence of milestones: Vessel depart origin (M14)→Vessel depart origin (M14)→Vessel arrive destination (M21).

But referring to the current search space graph, the transition Vessel depart origin (M14)→Vessel depart origin (M14) is invalid because there is no edge that connects M14 to itself. This makes sense because a vessel cannot depart the same origin port twice. In this case, the highest probability corresponding to a valid assignment is: Vessel depart origin (M14)→BAD DATA→Vessel Arrive Destination (M21).

Moreover, because the second status code (corresponding to an Indicator value of 2) is labeled as BAD DATA, the sequence of status codes that includes the first and third status codes is valid if we exclude consideration of the second status code when applying the constraints on the search space graph. This results in the following predicted sequence of milestones: Vessel depart origin→Vessel Arrive Destination, which is a valid transition.

Generating a probability of rejection corresponding to the likelihood that the received data is bad provides a mechanism for filtering out bad data that can compromise the accuracy of the system's predictions. This enables the system to deal with status codes that are received out of order or are just incorrect (e.g., fake statuses, incorrect locations, incorrect timestamps, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A computer-implemented method of classifying indicators, the method comprising:

accessing, by at least one processor, a sequence of indicators;

detecting, by the at least one processor, at least one duplicate indicator in the sequence of indicators;

removing, by the at least one processor, the at least one duplicate indicator from the sequence of indicators to reduce a computational complexity, the removing resulting in a deduplicated sequence of indicators;

selecting, by the at least one processor, a first indicator in the deduplicated sequence of indicators;

assigning, by the at least one processor, a label to the first indicator;

referencing, by the at least one processor, a milestone graph defining a valid ordered sequence of transitions to milestones and associated constraints;

generating, by the at least one processor, a current search space graph comprising a set of valid paths through a set of milestones in response to the milestone graph and the deduplicated sequence of indicators;

selecting, by the at least one processor, a node on the search space graph in response to the label that was assigned;

defining, by the at least one processor, a state for the node that was selected;

determining, by the at least one processor, that an end of the deduplicated sequence of indicators has been reached; and returning, by the at least one processor, a classification result comprising a predicted sequence of milestones corresponding to the deduplicated sequence of indicators, to improve an efficiency in finding an optimal solution in a tractable manner.

2. The computer-implemented method of claim 1, further comprising:

prior to determining that the end of the sequence of indicators has been reached, determining that the end of the sequence of indicators has not been reached.

3. The computer-implemented method of claim 2, further comprising:

after determining that the end of the sequence of indicators has not been reached, selecting a next indicator in the sequence of indicators;

selecting a transition to a next node on the search space graph; and assigning an additional label to the next indicator in response to the transition that was selected.

4. The computer-implemented of claim 3, further comprising:

repeating the selecting the next indicator, the selecting the transition, and the assigning the additional label until the end of the sequence of indicators has been reached.

5. The computer-implemented method of claim 3, wherein selecting the transition to the next node on the search space graph comprises:

selecting the transition to the next node on the search space graph in response to satisfying a set of constraints on an edge defining the transition.

6. The computer-implemented method of claim 1, wherein selecting the transition to the next node on the search space graph comprises:

selecting the transition to the next node on the search space graph based on a cost function.

7. The computer-implemented method of claim 1, further comprising:

forming the sequence of indicators.

8. A system for classifying indicators, the system comprising:

a memory storing a set of computer-executable instructions; and at least one processor interfacing with the memory and configured to execute the set of computer-executable instructions to cause the at least one processor to:

access a sequence of indicators, detect at least one duplicate indicator in the sequence of indicators, remove the at least one duplicate indicator from the sequence of indicators to reduce a computational complexity, the removing resulting in a deduplicated sequence of indicators, select a first indicator in the deduplicated sequence of indicators, assign a label to the first indicator, reference a milestone graph defining a valid ordered sequence of transitions to milestones and associated constraints, generate a current search space graph comprising a set of valid paths through a set of milestones in response to the milestone graph and the deduplicated sequence of indicators, select a node on the search space graph in response to the label that was assigned, define a state for the node that was selected, determine that an end of the deduplicated sequence of indicators has been reached, and return a classification result comprising a predicted sequence of milestones corresponding to the deduplicated sequence of indicators, to improve an efficiency in finding an optimal solution in a tractable manner.

9. The system of claim 8, wherein the at least one processor is configured to execute the set of computer-executable instructions to further cause the at least one processor to:

prior to determining that the end of the sequence of indicators has been reached, determine that the end of the sequence of indicators has not been reached.

10. The system of claim 9, wherein the at least one processor is configured to execute the set of computer-executable instructions to further cause the at least one processor to:

after determining that the end of the sequence of indicators has not been reached, select a next indicator in the sequence of indicators, select a transition to a next node on the search space graph, and assign an additional label to the next indicator in response to the transition that was selected.

11. The system of claim 10, wherein the at least one processor is configured to execute the set of computer-executable instructions to further cause the at least one processor to:

repeat the selecting the next indicator, the selecting the transition, and the assigning the additional label until the end of the sequence of indicators has been reached.

12. The system of claim 8, wherein to select the transition to the next node on the search space graph, the at least one processor is configured to:

select the transition to the next node on the search space graph in response to satisfying a set of constraints on an edge defining the transition.

13. The system of claim 8, wherein to select the transition to the next node on the search space graph, the at least one processor is configured to:

select the transition to the next node on the search space graph based on a cost function.

14. The system of claim 8, wherein the at least one processor is configured to execute the set of computer-executable instructions to further cause the at least one processor to:

form the sequence of indicators.

15. A non-transitory computer readable medium storing a set of computer instructions executable by at least one processor, the set of computer instructions comprising:

instructions for accessing a sequence of indicators;

instructions for detecting at least one duplicate indicator in the sequence of indicators;

instructions for removing the at least one duplicate indicator from the sequence of indicators to reduce a computational complexity, the removing resulting in a deduplicated sequence of indicators;

instructions for selecting a first indicator in the deduplicated sequence of indicators;

instructions for assigning a label to the first indicator;

instructions for referencing a milestone graph defining a valid ordered sequence of transitions to milestones and associated constraints;

instructions for generating a current search space graph comprising a set of valid paths through a set of milestones in response to the milestone graph and the deduplicated sequence of indicators;

instructions for selecting a node on the search space graph in response to the label that was assigned;

instructions for defining a state for the node that was selected;

instructions for determining that an end of the deduplicated sequence of indicators has been reached; and instructions for returning a classification result comprising a predicted sequence of milestones corresponding to the deduplicated sequence of indicators, to improve an efficiency in finding an optimal solution in a tractable manner.

16. The non-transitory computer readable medium of claim 15, wherein set of computer instructions further comprise:

instructions for, prior to determining that the end of the sequence of indicators has been reached, determining that the end of the sequence of indicators has not been reached.

17. The non-transitory computer readable medium of claim 16, wherein set of computer instructions further comprise:

instructions for, after determining that the end of the sequence of indicators has not been reached, selecting a next indicator in the sequence of indicators;

instructions for selecting a transition to a next node on the search space graph; and instructions for assigning an additional label to the next indicator in response to the transition that was selected.

18. The non-transitory computer readable medium of claim 17, wherein set of computer instructions further comprise:

instructions for repeating the selecting the next indicator, the selecting the transition, and the assigning the additional label until the end of the sequence of indicators has been reached.

19. The non-transitory computer readable medium of claim 17, wherein the instructions for selecting the transition to the next node on the search space graph comprise:

instructions for selecting the transition to the next node on the search space graph in response to satisfying a set of constraints on an edge defining the transition.

20. The non-transitory computer readable medium of claim 15, wherein the instructions for selecting the transition to the next node on the search space graph comprise:

instructions for selecting the transition to the next node on the search space graph based on a cost function.

* * * * *